(12) United States Patent
Hsu

(10) Patent No.: US 12,434,209 B2
(45) Date of Patent: Oct. 7, 2025

(54) UNIVERSAL MIXTURE MAKER

(71) Applicant: Fred Hsu, Port Washington, NY (US)

(72) Inventor: Fred Hsu, Port Washington, NY (US)

( * ) Notice: Subject to any disclaimer, the term of this patent is extended or adjusted under 35 U.S.C. 154(b) by 255 days.

(21) Appl. No.: 18/177,125

(22) Filed: Mar. 2, 2023

(65) Prior Publication Data
US 2023/0201782 A1    Jun. 29, 2023

Related U.S. Application Data

(60) Provisional application No. 63/331,823, filed on Apr. 16, 2022.

(51) Int. Cl.
*G01F 23/02* (2006.01)
*B01F 35/21* (2022.01)
*B01F 35/42* (2022.01)
*B01F 35/50* (2022.01)

(52) U.S. Cl.
CPC ........ *B01F 35/514* (2022.01); *B01F 35/2112* (2022.01); *B01F 35/42* (2022.01); *G01F 23/02* (2013.01)

(58) Field of Classification Search
CPC .......... G01F 19/00; G01F 23/02; B01F 35/42; B01F 35/514; B01F 35/2112
See application file for complete search history.

(56) References Cited

U.S. PATENT DOCUMENTS

| | | | | |
|---|---|---|---|---|
| 3,948,105 A * | 4/1976 | Johnson, Jr. | ............ | G01F 19/00 422/256 |
| 4,721,393 A * | 1/1988 | Kwast | .................. | B01F 35/894 73/426 |
| 5,125,466 A * | 6/1992 | Felt | ......................... | G01F 19/00 177/207 |
| 5,375,742 A * | 12/1994 | Mowry | ............... | B01F 33/5011 222/131 |
| 5,406,995 A * | 4/1995 | Gantzer | .................... | B67D 7/74 73/426 |
| 5,758,540 A * | 6/1998 | Davila | ................... | B67D 7/085 73/426 |
| 8,197,116 B2 * | 6/2012 | Klein | ..................... | A01K 39/04 206/219 |
| 8,827,104 B2 * | 9/2014 | Hickox | .............. | A47G 23/0633 220/575 |
| 9,119,490 B1 * | 9/2015 | Parodi, Jr. | .............. | A47G 19/22 |
| 2015/0257559 A1 * | 9/2015 | Shalmoni | ........... | A47G 19/2288 206/514 |
| 2023/0201782 A1 * | 6/2023 | Hsu | ..................... | B01F 35/2112 73/323 |

* cited by examiner

*Primary Examiner* — Jamel E Williams

(57) ABSTRACT

A volumetric instrument serving as a universal mixture maker. The instrument comprises fixed-shape solute cups that can be submerged in and fastened to solvent containers. The design allows a human operator to run an iterative method which finds a solution to a set of multivariate equations that would otherwise require situation-specific analytical calculations and the use of weighing scales. The iterative method can solve for one or more variables including solute volume, solvent volume, final mixture volume, and final solute concentration level. Cups and containers act as a mechanical calculator with a single parameter for the operator to manually adjust: how much of a solute cup to submerge in a solvent container. The mechanical calculator reduces mixture equations down to two markings for the operator to visually align: an output mixture marking on a cup, and a volumetric marking on a container.

20 Claims, 25 Drawing Sheets

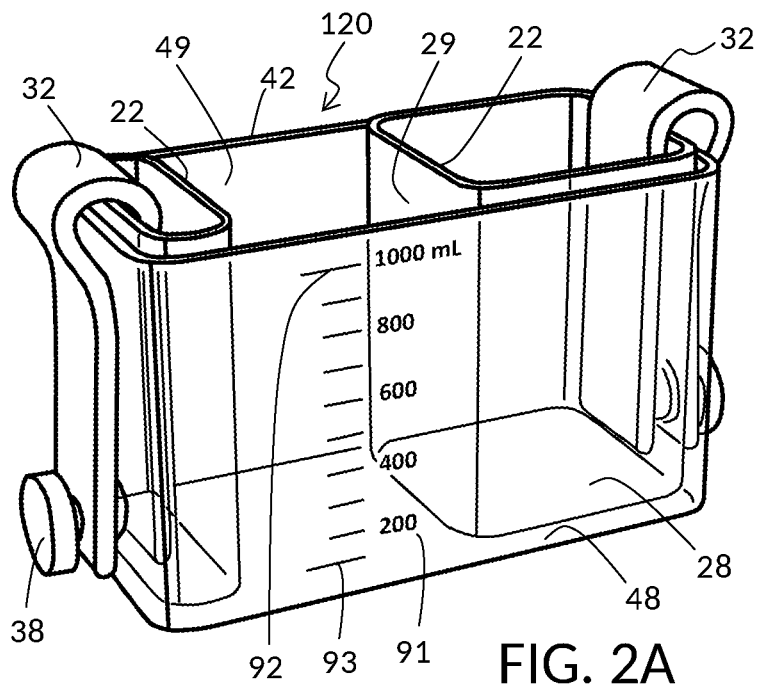
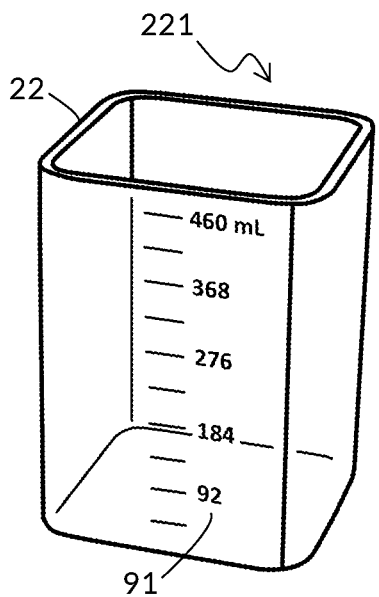 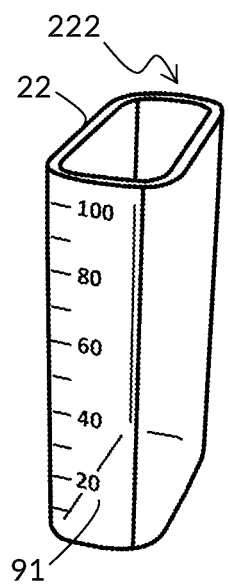 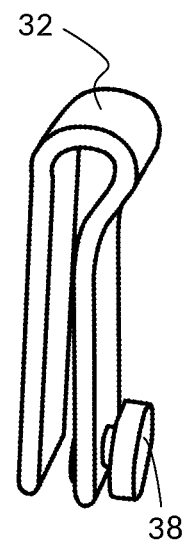
FIG. 2A
FIG. 2B    FIG. 2C    FIG. 2D

UNIVERSAL MIXTURE MAKER

CROSS-REFERENCE TO RELATED APPLICATIONS

This application claims the benefit of U.S. Provisional Patent Application No. 63/331,823, filed Apr. 16, 2022, which is incorporated by reference herein in its entirety.

TECHNICAL FIELD OF THE INVENTION

Various embodiments of the present disclosure relate to visual mixture making, and in particular to a volumetric instrument and a method, for the preparation of a mixture of a total volume at desired concentration levels, from a solvent and one or more solutes, by visual observations using fixed-shaped containers and cups, without the use of weighing scales and analytic formulae.

BACKGROUND OF THE INVENTION

Many activities in chemistry labs and in kitchens involve making mixtures from solutes and solvents. For instance, a chemist may mix a salt (solute) with water (solvent) to get a saline solution with a desired concentration. For instance, a home chef may mix rice (solute), milk (solute) and sugar (solute) with water (solvent) in appropriate proportions to make a suspension which can be processed into rice pudding. Both solute and solvent may be in a solid state, a liquid state, or even a gaseous state. In the present disclosure, solid and liquid are used as sample solutes, and water is used as the solvent in many scenarios. However, volumetric instruments and methods hereby disclosed apply to all types of solutes and solvents in any state of matter.

Measurement of either the weight or the volume of solutes and solvents is a critical part of making mixtures. Proper measurement based on desired concentration levels of solutes in a final mixture enables an operator to obtain target physical and chemical properties in the final mixture. These desired concentration levels can be expressed on a mass-to-mass basis (wt % or % m/m), on a volume-to-volume basis (vol % or % v/v), or on a mass-to-volume basis (molarity M or g/L). Sometimes a small error in measurement causes significant changes in the final mixture. For instance, a 12 wt % saline solution becomes slushy in a typical consumer freezer set to 0° F. But a slightly less concentrated solution at 10 wt % NaCl becomes significantly more solid and ice-like under the same setting. On the other hand, a slightly more concentrated solution at 14 wt % remains viscously liquid. For other scenarios, such as the majority of home cooking involving both solids and liquids, even a 10% error or more in measurements is tolerable, when measuring solids such as flour and rice by volume.

Different measuring instruments come with different measurement errors. In general, lab mixtures requiring a high precision are measured by percentage by mass with weighing scales, or percentage by volume with high-precision volumetric glassware such as volumetric flasks which afford an error rate as small as 0.1% of the capacity of a calibrated flask. Less stringent measures can be taken with graduated cylinders with an error of 1% of its capacity. In a home kitchen, measuring cups often have an error of 5% to 10%, and measuring spoons may come with an error of up to 30%.

In many situations in labs and at home, it is possible to measure, by volume, solutes that would normally be solid granules at room temperature, even though measuring by weight would be more accurate in some cases. Many solid granules are available in liquid form known as a concentrated stock solution, hereafter referred to simply as stock. For instance, salt (NaCl) is available dissolved in water at a concentration of 5M (molarity), an almost saturated solution at 292 NaCl g/L or 24.54 wt % that can be measured by volume. For home cooking, percentage volume instead of percent weight is often used for convenience with solids such as salt, sugar, baking soda, flour and rice, as some cooks do not have access to scales at home kitchens. Fortunately, most solid ingredients come in known granule sizes, such that weight can be approximated by volume, given the greater error tolerance in home cooking, thus the prevalence of measuring devices such as calibrated teaspoons, tablespoons and cups.

Many common solvents are liquid and have known density at room temperature. They can thus be measured by either weight or volume, given known conversions between these two measures. A common solvent is water, and 1 gram of water at room temperature is roughly equivalent to 1 liter. Thus water is often measured by volume, even when a percentage is specified on a mass-to-mass basis such as wt %. With aqueous solutions, it is possible to convert between wt % and molarity M when density of a solution is known. Thus, even though the present disclosure describes mainly volumetric measurements, it is equally applicable to measurements specified by mass or weight, given the above understanding.

The preparation of a mixture starts with the determination of the nature of a final mixture desired. The final mixture will have a final mixture volume (mix_vol). The final mixture volume will contain one or more solutes, plus a solvent with a particular solvent volume (solv_vol). Each solute will have a measurable volume (t1_vol, t2_vol, . . . tn_vol). Before a mixture is made, a solute may be procured as a solid, a liquid, or a concentrated stock solution dissolved in the same solvent type. A solute's initial concentration (t1_vol %, tn_vol %, . . . tn_vol %) before mixing may be 100% for solid and liquid, or a lesser number when procured in as a stock where its solute volume (tn_vol) includes both pure solutes and some solvents. When all solutes (t1_vol, t2_vol, . . . tn_vol) and the solvent (solv_vol) are mixed, the final mixture volume (mix_vol) is obtained. And each solute will then have a new final concentration level (t1_in_mix_vol %, t2_in_mix_vol %, . . . tn_in_mix_vol %) expressed as a ratio against the final mixture volume (mix_vol).

These relationships between solutes, solvent and the final mixture are expressed by equations that follow. Every symbol, or variable, in these equations can be assigned a known value, or remain as an unknown to be calculated or derived through the process of making a mixture.

$$t1\_vol + t2\_vol \ldots + tn\_vol + solv\_vol \cong mix\_vol$$

$$t1\_vol\,\% * t1\_vol = t1\_in\_mix\_vol\,\% * mix\_vol$$

$$t2\_vol\,\% * t2\_vol = t2\_in\_mix\_mol\,\% * mix\_vol$$

$$\ldots$$

$$tn\_vol\,\% * tn\_vol = tn\_in\_mix\_vol\,\% * mix\_vol$$

One common task performed in labs is to create a diluted NaCl solution of a desired volume mix_vol with a desired final NaCl percentage t1_in_mix_vol %, using a saturated stock NaCl of 5M as its initial concentration t1_vol %. In this scenario, only one solute is involved. Thus the equations involved are reduced to the following:

$$t1\_vol + solv\_vol \approx mix\_vol$$

$$t1\_vol\,\%*t1\_vol = t1in\_mix\_vol\,\%*mix\_vol$$

Variables mix_vol, t1_in_mix_vol % and t1_vol % are given, and are thus fixed as known values in the two equations. Variables t1_vol and solv_vol are unknown. However, within just the second equation, t1_vol is the only unknown variable. Thus it can be calculated and given a known value. This further allows solv_vol to be "approximately" derived from the first equation. Now that variables are known, an operator can pour a concentrated NaCl stock and a solvent into volumetric instruments, measure them to get the right amounts, and mix them into a final solution.

The volume of a mixture is almost never equal to the simple sum of solute volume and solvent volume. The reason is that intermolecular forces of a mixture are different from those in a pure solute and in a pure solvent. For instance, salt-water solutions have a mixture volume smaller than the simple sum of salt (NaCl) and water. This phenomenon is described by the "partial molar property" of a substance. For a solute in a solvent, the "partial molar volume" of the resulting solution better predicts the resulting solution volume than ideal, simple sums. But partial molar property is a complicated multivariate subject, and solution making processes largely skirt this issue. Partial molar property is why in the preceding paragraph, the solvent volume "solv_vol" was said to be only "approximately" derived. Partial molar property is also why a precision solution made in labs traditionally requires a specific procedure whereby a solute is first dissolved with only a portion of the required solvent in a precision volumetric flask, and additional solvent is then added to top off the solution to exactly the required amount.

As mentioned before, in some scenarios, solutes are expressed in mass (or weight). The above equations can be rephrased with a mass-over-mass unit such as wt %, and the same procedure applies, except that solutes would be weighed by a scale, and not measured by volume. If a scale is not available, it is possible to convert a solute weight value to a volume. For solid solutes in uniform and known granule size, an equivalent volumetric instrument may be used to measure them instead.

Yet another scenario involves an attempt to create as much solution as possible, out of a short supply of a solute. Imagine a lab needing to make a maximum amount of a final solution containing 1M NaCl and 30 vol % glycerol, out of a 5M NaCl stock and a 100 vol % glycerol stock. There are plenty of stock glycerol. But there is only 86 mL of stock 5M NaCl available. In this case, an operator will need to first solve equations to arrive at a maximum mixture volume that can be obtained from available stock 5M NaCl. Using the mixture volume as a known value, the operator can then calculate the amount of stock glycerin needed.

Suppose both stock NaCl and stock glycerin are both in short supply. It is not known which of these stock solutions is the constraining factor in making a maximum amount of final mixture. Now the operator will need to perform two sets of calculations, to determine the maximum amount of final mixture attainable, and the constraining stock, before calculating the required volume of the non-constraining stock.

In yet another instance, an operator wants to ensure that there are at least 300 mL of solvent (solv_vol) in a final mixture. In this case, the final mixture volume mix_vol is unknown. And mix_vol depends on the unknown solute volume t1_vol of initial concentration t1_vol % that is required. Again, the equations shown earlier can be rearranged, in order to first determine t1_vol, by solving the equation t1_vol=(t1_in_mix_vol %*(t1_vol+300 mL))/t1_vol %. Then mix_vol can be approximately calculated as the sum of t1_vol+300 mL. Again, refer to the partial molar property discussed earlier on why this sum is only an approximation.

The above lab scenarios apply to a home kitchen as well, whether solutes are solid or liquid, and whether the final mixture is a solution or a suspension. Suppose a home chef has been making brown sugar rice pudding for a long time, habitually using various cooking utensils and various drinking vessels in his kitchen to measure amounts of ingredients. The home chef has found over time that the magical recipe involves exactly 1 tea cup of milk, 1 thermal coffee mug of rice and 1 leveled spatula of brown sugar, mixed with 1 bowl of water. If today the chef only needs to make half of the portion, then he will need to figure out the actual ratios or concentrations of these ingredients, before he can scale down amounts, since most of these containers don't easily allow assessment of half volumes. Similarly, if the chef wishes to tell his friends about this recipe, he will need to measure all these ingredients, and calculate their ratios. In this scenario, solute volumes, initial solute concentration levels, and the solvent volume are known. The unknowns are final concentration levels, and the slightly-reduced mixture volume due to partial molar property.

There exist a wide variety of volumetric instruments that assist operators with measurements of solutes. But these instruments still require the use of weighing scales in some situations. They still task operators with choosing the right formulae to use, and with carrying out analytic calculations. Abovementioned lab and cooking situations illustrate four primary variables in mixture equations: solute volume, solvent volume, final mixture volume, and final solute concentration level. Any of these variables may be an unknown in a lab or cooking situation, while the remaining variables are fixed by necessity or by request. Tasking operators with juggling these variables and calculations has been accepted as a necessary fact of life.

But it doesn't have to be so. These long-felt inadequacies and unresolved needs can actually be answered by mechanical and visual instrumentation. It's just that those skilled in the art has so far assumed the problem to be insoluble or potential solutions to be unworkable. I will now discuss a universal volumetric instrument capable of addressing these varied situations in mixture making, without burdening operators with calculations.

BRIEF SUMMARY

Referencing FIG. 4A, I present an embodiment of a universal volumetric instrument which helps an operator create a diluted NaCl solution of 430 mL with a desired final NaCl concentration of 2M, using a 5M NaCl stock as its initial concentration level, without resorting to calculations. The instrument comprises a solute cup and a solvent container, where the cup can be submerged in the container. The transparent solute cup shown in FIG. 4B is formed in the shape of a typical conical measure, and is designed to measure 5M NaCl (salt) stock for dilution in water (H2O). Calibrated indicia columns for various output concentration levels are printed on its sidewall. The transparent solvent container shown in FIG. 4C also takes the shape of a conical measure. The container has volumetric indicia printed on its sidewall, and provides a threaded rod to receive the solute cup.

To make a diluted 2M solution from this solute setup, first identify the calibrated indicia column with 2M as its output concentration level on the solute cup, as shown in FIG. 4D. Further identify the output mixture marking with 430 mL as its label. Switching to the solvent container shown in FIG. 4E, identify the mixture marking with 430 mL on the container sidewall. Thread the cup onto the container as shown in FIG. 4F, and align the identified 430 mL marking on the cup with the identified 430 mL marking on the container. The instrument is now set up for visual measurement of both solute and solvent. Fill the cup with 5M NaCl stock up to the marking on the cup as shown in FIG. 4G. Then fill the container with water up to the marking on the container as shown in FIG. 4H. Visually confirm that surface levels of NaCl and water align, and go back to previous steps to make changes as needed, including using a different output solution volume, and choosing a different output concentration level. Measured NaCl and water may be mixed in the solvent container as shown in FIG. 4J, or poured out into a separate volumetric flask for mixing.

Table salt in solid granules may be used as the solute, instead of in liquid form such as the 5M stock described earlier. Calibrated indicia columns can be tailored to a particular grain size and granule shape, as shown in FIG. 4K. Indicia columns represent desired output concentration level in wt %, from 1 wt % for lens cleaning, to 3.5 wt % for seawater, to 12 wt % for slushy saline ice, and to 23.3 wt % yielding the lowest freezing point. Output mixture marking are continuous lines that connect one concentration level to the next, allowing a user to interpolate output mixture volumes. To measure table salt, follow the same process for the 5M NaCl stock. Fine table salt is found in cubic crystals of approximately 0.3 mm width. One gram of such fine table salt takes up approximately 0.87 mL, or almost twice its pure crystal volume of 0.46 mL, due to its bulk density. As a result of this bulk density, the resulting output NaCl solution will have an actual volume smaller than the target volume.

Thus, cheap NaCl granules such as table salt are inaccurate when measured by volume, due to bulk density. And bulk density causes actual solution volume to differ from an initial target. This issue can be remediated by using a concentrated stock as a liquid solute instead, such as the 5M NaCl stock mentioned earlier. But concentrated stock solutions such as 5M NaCl are extremely expensive. I present an alternative way to generate an accurate solution from inexpensive solid granules, using a setup shown in FIG. 4L. This solute cup is designed to use a 26 wt % saline stock as input. 26 wt % is a saturated concentration above which NaCl crystals will not further dissolve at room temperature. First, use the special indicia column "table salt to 26 wt %" to estimate the approximate amount of table salt needed to make a particular volume of saturated stock solution, using the same process described earlier, even though the solute is now table salt crystals, and not a stock solution. Fully dissolve measured table salt in said particular volume of water, and add some more until crystals stop dissolving. Pour the saturated stock solution into a holding vessel, and discard undissolved crystals. Then use this saturated stock solution as an input solute at 26 wt % to make a diluted solution of a desired concentration level using the rest of calibrated indicia columns. FIG. 4M illustrates an unfolded view of the outer surface of the solute cup, showing the special indicia column "table salt to 26 wt %" on the right, and the rest of calibrated indicia columns connected by continuous mixture marking lines.

Referencing FIG. 4N and FIG. 4P, I present two solute cups in a universal volumetric instrument which helps an operator create as much solution as possible, containing 1M NaCl and 30 vol % glycerol, using a 5M NaCl stock and a 100 vol % glycerol stock. But there is very little 5M NaCl stock left. All of it should be used. The solute cup shown in FIG. 4N is similar to that shown in FIG. 4B, except that the solute cup in FIG. 4N includes volumetric indicia indicating actual solute volume of 5M NaCl stock in the cup. The solute cup is temporarily threaded into a stand, so it can stand on its own, when not threaded into a solvent container. The 100 vol % glycerol solute cup shown in FIG. 4P similarly provides volumetric indicia, stands on its own, and has calibrated indicia columns for various output concentration levels of glycerol printed on its sidewall.

To make the maximum amount of solution from this solute setup, fill the 5M NaCl solute cup with all available stock solution, as shown in FIG. 4Q. A volumetric solute marking confirms that the cup holds 86 mL of this 5M NaCl stock. The volumetric readout is for informational only, in this exercise. The readout is not necessary for carrying out this solution making. Identify the calibrated indicia column with 1M as its output concentration level, as shown in FIG. 4Q. Read the output mixture marking that aligns with the surface level of the 5M NaCl stock. It reads 430 mL. This is the maximum amount of solution that can be made. Identify the calibrated indicia column for 30 vol % on the 100 vol % glycerol cup, and pour in glycerol to the mixture marking for 430 mL, as shown in FIG. 4R. The volumetric readout on this cup shows that it holds approximately 130 mL glycerol. Again, this readout is for information only. Now, pour measured 86 mL of 5M NaCl into the glycerol cup, as shown in FIG. 4S. Top off the same glycerol cup with water up to a volumetric marking of 430 mL, as shown in FIG. 4T. For this exercise, a solvent container is not strictly necessary. It could help with a visualization of expected solution volume in various steps. But as demonstrated, only two solute cups were required for this scenario, thanks to the addition of volumetric indicia to solute cups. Later scenarios will demonstrate how the solvent container plays an essential role.

Sometimes it is not known which input solute out of several ingredients is the constraining factor in making a maximum amount of output solution. In such a case, follow similar steps described earlier, but fill both solute cups shown in FIG. 4Q and FIG. 4R in parallel. Fill each cup in incremental amounts of 5M NaCl and 100 vol % glycerol, respectively. Keep an eye on both surface levels, and track output mixture markings they reach. Continue to pour each solute in stepwise increments, so that both surface levels rise synchronously and point to same increasing output mixture numbers. When one solute supply runs out, the output mixture marking indicates the maximum amount of solution that can be made. If the water solvent could also be a constraining factor, then this interactive and iterative search will require the use of a solvent container, similar to the next scenario.

Referencing FIG. 4C and FIG. 4P, I present an embodiment of a universal volumetric instrument which helps an operator create a diluted glycerol solution with a desired final glycerol concentration of 30 vol %, from a 100 vol % glycerol solute, with exactly 300 mL of solvent water, without having to resort to calculations. The solvent container shown in FIG. 4C has volumetric indicia printed on its sidewall. The solute cup shown in FIG. 4P provides volumetric indicia as well, stands on its own detachable stand, and has calibrated indicia columns for various output concentration levels of glycerol printed on its sidewall.

To use 300 mL of water and 100 vol % glycerol to create a diluted 30 vol % solution, first fill the solvent container with exactly 300 mL of water, as shown in FIG. 4U. Thread the glycerol solute cup onto the solvent container, and identify the calibrated indicia column for 30 vol % on the cup, as shown in FIG. 4V. Slowly turn the cup to lower it into the water, while tracking two numbers: 1) the volumetric marking on the container indicated by the rising surface of the water solvent, and 2) the output mixture marking in the 30 vol % indicia column indicated by the same rising surface of the water solvent. The volumetric marking increases slowly, starting from 300 mL. The output mixture marking increases faster, starting from 0 mL. When the output mixture marking catches up to the volumetric marking, such that they both indicate the same number, stop. Both markings should read about 430 mL, the total volume of the final solution, shown in FIG. 4V. Fill the cup with glycerol such that its surface level aligns with that of the water, as shown in FIG. 4W. The solute cup should show a volumetric marking of 130 mL, the volume of glycerol used. Both solute and solvent are now properly measured, and can be mixed.

The process just described is an example of a mechanical calculator. A human operator runs an iterative method which finds a solution to a set of multivariate equations. A universal volumetric instrument reduces these variables down to one parameter for the operator to adjust: how much of the solute cup to submerge in the water solvent. The instrument reduces equations down to two markings for the operator to visually align: the volumetric marking on the container, and the output mixture marking on the cup.

Referencing FIG. 4X and FIG. 4Y, I present an embodiment of a universal volumetric instrument which helps a chef measure common ingredients used in cooking. In a kitchen, solid granules often do not dissolve in solvents. Some soak up liquid solvents, such as cereals in milk. Some remain heterogeneous and accommodate large amount of liquid solvents in voids between granules, such as rice grains. These mixtures are usually not specified as a ratio between a solute and a solution, regardless of whether mass or volume is used for the measurement. Instead, they are specified as a ratio between a solute and a solvent using standard volumetric units. So for instance, a recipe may call for 2 cups of long grain white rice to 3 cups of water. FIG. 4X illustrates a generic solvent container with several sets of volumetric indicia printed on its sidewall, in various standard volumetric units including mL, pint, cups, oz, tablespoon and teaspoon. FIG. 4Y illustrates a generic solute cup designed to measure solutes at various solute-to-solvent ratios.

To measure the right amount of rice at abovementioned 2:3 ratio, for 1 bowl of water, first pour the 1 bowl of water into the generic solvent container. Identify the calibrated indicia column for 2:3 on the generic solute cup. Screw the cup onto the container, and lower the cup into the water. Track the mL volumetric marking on the container indicated by the rising surface level of the water solvent against the output mixture marking on the solute cup. Mechanically find the right height for the cup using the same process mentioned earlier for making a 30 vol % glycerol solution with 300 mL of water solvent. Then pour rice into the cup, matching the water surface level. In this scenario, partial molar property does not apply, as the ratio of an ingredient is disconnected from the mixture volume. In another scenario, the same solute cup and solvent container can be used to mechanically compute the amount of water needed for one spatula of rice. In yet another scenario, the solvent container can be used to convert volumetric measures between common units, after the chef mechanically finds the right amount of rice.

A home chef may want to measure at least one tea cup of rice as a solute, or at least one thermal coffee mug of water as a solvent, whichever produces a larger amount of final mixture at the same 2:3 rice-to-water ratio. In this case, the amount of both rice and water are unknown. This calculus can be done mechanically too. First pour one tea cup of rice into the solute cup, and one thermal coffee mug of water into the solvent container. Adjust the height of the cup such that surface levels of rice and water align. Identify the calibrated indicia column for 2:3 on the solute cup. If the output mixture marking on the cup shows the same number as the volumetric marking on the container, then the rice to water ratio is exactly 2:3. If the output mixture marking shows a greater number than the volumetric marking, then there is more rice than water. So raise the cup, and top off the container with water up to the number indicated by the output mixture marking. If the volumetric marking shows a greater number, then there is more water than rice. So lower the cup until the output mixture marking catches up to the volumetric marking indicated by the surface of the water. Add more rice into the cup up to the surface level of the water.

Referencing FIG. 4X and FIG. 4Y again, I present an embodiment of a universal volumetric instrument which helps a cook find ingredient ratios for a dish he has perfected by trial and error. He has found that a prefect rice pudding is created from exactly 1 tea cup of milk, 1 thermal coffee mug of rice and 1 leveled spatula of brown sugar, mixed with 1 bowl of water. These are all common vessels found in his home kitchen. Now he wants to write down ratios among these ingredients, so this dish may be recreated at any proportion.

To find ratios for all ingredients, first choose one ingredient to play the role of the solvent, the common denominator for all ingredient ratios. The 1 bowl of water is a good common denominator. Pour 1 bowl of the water into a solvent container. Take the first ingredient, a tea cup of milk, and pour it into the solute cup. Thread the cup onto the container, and submerge the cup in water until surface levels of milk and water align. Take note of the volumetric marking indicated by the water. Let's say the water level indicates a 430 mL volumetric marking. Find this same number 430 mL on an output mixture marking line on the cup. In this solute cup, as shown in FIG. 4Y and FIG. 4Z, output mixture markings form continuous lines span multiple indicia columns, unlike the solute cup in FIG. 4B where each indicia column has its own segregated marking lines. Follow the 430 mL mixture marking line until it intersects with the surface of milk. If the intersection point is on a vertical line of an indicia column, then the ratio number of this indicia column represents the milk-to-water ratio. If the point is between vertical lines, then interpolate between indicia columns to arrive at an intermediate ratio. Repeat the same for other ingredients, and write down ratios found.

In summary, I have shown that a volumetric instrument hereby disclosed is universally applicable in varied scenarios that would otherwise require complex calculations where an operator analytically solves mixture-making equations for one or more variables, including solute volume, solvent volume, final mixture volume, and final solute concentration level. The instrument reduces otherwise-complicated and situation-specific analytic calculations down to a manual adjustment of the degree of cup submersion, and a visual comparison of surface level markings.

BRIEF DESCRIPTION OF THE DRAWINGS

FIG. 2A is a perspective view of the second embodiment of the present disclosure, showing a universal mixture maker 120 with two hexahedron solute cups, a hexahedron solvent container, and C-clamp retaining members that can fasten said cups to said container.

FIG. 2B is a perspective view of a solute cup model 221 of the second embodiment, for making a 12 wt % NaCl solution from a 26 wt % stock.

FIG. 2C is a perspective view of a solute cup model 222 of the second embodiment, for making a 10 vol % glycerol solution from a 100 vol % stock.

FIG. 2D illustrates a retaining member in the shape of a C-clamp, of the second embodiment.

REFERENCE NUMERALS

Figure 1A:
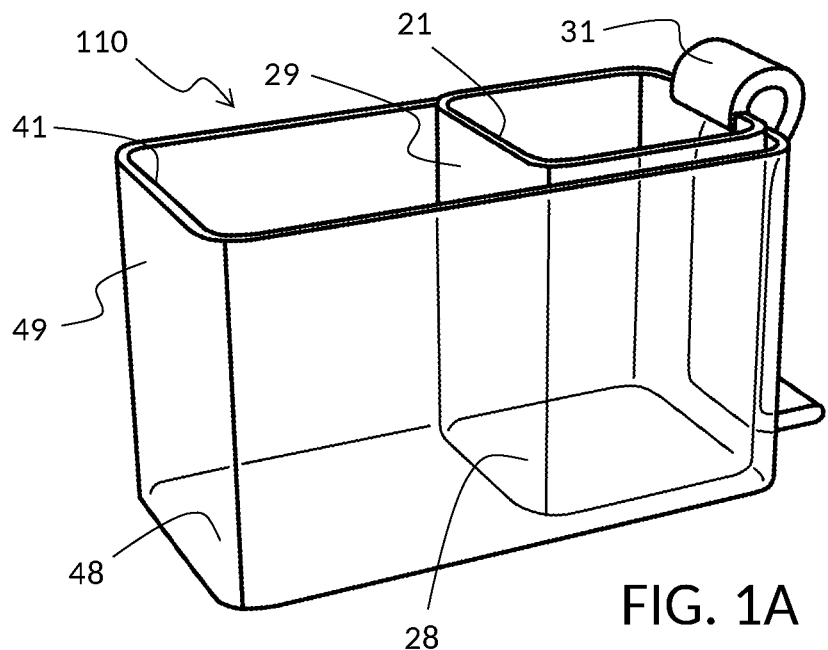
FIG. 1A is a perspective view of the first embodiment of the present disclosure, showing a universal mixture maker 110 with a hexahedron solute cup and a hexahedron solvent container.

It is noted that like parts are designated by like reference numerals throughout the accompanying drawings. A list of numbered parts is presented below:

21. A solute cup of the first embodiment in the shape of a hexahedron
22. A solute cup of the second embodiment in the shape of a hexahedron
23. A solute cup of the third embodiment in the shape of a cylinder with a T-slide
24. A solute cup of the fourth embodiment in the shape of a cone
25. A solute cup of the fifth embodiment in the shape of a cone
28. A bottom portion of a solute cup
29. A sidewall of a solute cup
31. A retaining member of the first embodiment in the shape of a clip
32. A retaining member of the second embodiment in the shape of a C-clamp
33. A retaining member of the third embodiment in the shape of a T-slide
34. A retaining member of the fourth embodiment in the shape of a threaded tube
35. A retaining member of the fifth embodiment in the shape of a threaded tube
36. A threaded rod projecting upward from a bottom portion of a solvent container
37. A T-slot carved into a sidewall of a container
38. A fastening knob on a retaining member
39. An adjustment tab on a retaining member
40. A base plate of a solvent container
41. A solvent container of the first embodiment in the shape of a hexahedron
42. A solvent container of the second embodiment in the shape of a hexahedron
43. A solvent container of the third embodiment with T-slots
44. A solvent container of the fourth embodiment in the shape of a cone
45. A solvent container of the fifth embodiment with 3 conical chambers
46. A flaring spout of a solvent container
47. A support fin of a solvent container
48. A bottom portion of a solvent container
49. A sidewall of a solvent container
70. A base plate of a solvent container of the fifth embodiment
75. A solvent chamber of a solvent container of the fifth embodiment
77. A support fin of a solvent chamber
78. A bottom portion of a solvent chamber
79. A plug for the bottom portion pipe of the fifth embodiment
80. Water used as a solvent 81. Saturated saline stock solution at 26 wt %
82. Concentrated 5M NaCl stock solution
83. Glycerol at 100 vol %
84. Long grain white rice
85. Milk
86. 3% hydrogen peroxide stock solution
87. 100% isopropyl alcohol
90. A mark made with a pen
91. Volumetric indicia with markings on a solvent container or a solute cup
92. A marking showing the max fill line
93. A marking showing the minimum fill line
94. A calibrated indicia column with calibrated markings
95. A calibrated indicia column with output mixture markings
96. A calibrated marking of a calibrated indicia column
97. A calibrated marking indicating an equivalent output mixture marking
98. A continuous and curved line spanning multiple calibrated indicia columns
99. A main label of a calibrated indicia column
110. A universal mixture maker of the first embodiment with built-in clips on cups
120. A universal mixture maker of the second embodiment with C-clamp fasteners
130. A universal mixture maker of the third embodiment with T-slot and T-slide
140. A universal mixture maker of the fourth embodiment with threaded rod and tube
150. A universal mixture maker of the fifth embodiment with three solvent chambers
211. A solute cup model for making a 12 wt % NaCl solution from a 26 wt % stock
212. A solute cup model for making a 3.5 wt % NaCl solution from a 26 wt % stock
213. A solute cup model for making a 20 vol % glycerol solution from a 100 vol % stock
221. A solute cup model for making a 12 wt % NaCl solution from a 26 wt % stock
222. A solute cup model for making a 10 vol % glycerol solution from a 100 vol % stock
223. A solute cup model for making a 3.5 wt % NaCl solution from a 5M stock
224. Cup model measuring 7 vol %-50 vol % glycerol solution from 100 vol % stock
231. Cup model for generic 30 vol % measuring (e.g. rice granules)
232. Cup model for generic 20 vol % measuring (e.g. milk)
233. Cup model for generic and variable 2 vol %-30 vol % measuring (e.g. rice granules)
234. Cup model for generic and variable 1 vol %-20 vol % measuring (e.g. milk)
241. Cup model for making various molar M dilutions from 5M NaCl stock
242. Cup model for making variable wt % NaCl solution from table salt
243. Cup model for variable wt % NaCl solution from 26 wt % stock, plus a special column
244. Cup model for variable molar M dilution from 5M NaCl, with volumetric indicia
245. Cup model for variable vol % glycerol from 100 vol % stock, with volumetric indicia
246. Cup model for measuring variable ratios between solute and solvent
251. Cup model designed to be used in a 3-chamber universal mixture maker
441. A conical solvent container
446. A conical solvent container with markings for standard unit conversions
451. A universal mixture maker whose solvent container comprises three chambers
811. A solution containing 12 wt % NaCl
813. A solution containing 12 wt % NaCl and 20 vol % glycerol
821. A solution containing 12 wt % NaCl and 10 vol % glycerol
822. A solution containing 15.5 wt % NaCl
831. A mixture containing 30 vol % rice and 20 vol % milk
841. A solution containing 2M NaCl
842. A solution containing 1M NaCl and 30 vol % glycerol Further areas of applicability of the present disclosure will become apparent from the detailed description provided hereinafter. It should be understood that the detailed description and specific examples, while indicating some embodiments of the disclosure, are intended for purposes of illustration only and are not intended to limit the scope of the disclosure.

DETAILED DESCRIPTION

One objective of the present disclosure is the elimination of the need to write and solve situation-specific equations during mixture making. A similar objective of the present disclosure is the elimination of weighing scales from the mixture-making process. A novel design of a volumetric instrument allows fixed-shape solute cups and solvent containers to make redundant both analytic equation-solving and weighing scales.

Another objective of the present disclosure is the universality of an iterative method for measuring volumes of solutes, solvents and solutions. This iterative method leverages the novel design of a volumetric instrument from the present disclosure, comprising mechanical calculations that a human operator carries out by manually adjusting a solute cup, and visually aligning said cup to a solvent container. These manual and visual operations are universally applied despite different variables to solve for, including solute volume, solvent volume, mixture volume and concentration levels.

Yet another objective of the present disclosure is the simplicity of manufacturing said universal volumetric instrument. At the most basic level, the instrument involves only a fixed-shape cup and a fixed-shape container, plus a fastening mechanism. Cups and containers are simple vessels with a fixed volume. The instrument does not require plungers, pivots, hinges, moving walls, or flexible seals. If desired, all components can be manufactured with the same process (e.g. injection molding or vacuum forming), and made with the same material (e.g. transparent plastic or glass).

The simplicity of manufacture furthers a related goal of the present disclosure, the durability of the volumetric instrument. Without moving walls, flexible seals and other complex machineries, the instrument can be made robust and easy to maintain.

First Embodiment

FIG. 1A illustrates the first embodiment of the present disclosure, a universal mixture maker 110. The mixture maker is primarily a volumetric instrument. The instrument comprises a solute cup 21 for holding a solute, and a solvent container 41 for holding a solvent. Solvent container 41 comprises four sidewalls 49, and a bottom portion 48. Solute cup 21 comprises four sidewalls 29 and a bottom portion 28. A retaining member 31 is permanently built into solute cup 21 as an extended portion. Retaining member 31 is resilient and is shaped in the form of a clip. Solute cup 21 can be removably engaged to solvent container 41 as shown in in FIG. 1A. The resiliency of retaining member 31 allows solute cup 21 to be securely fastened to solvent container 41, at any desired height, from a low height where the bottom portion 28 of solute cup 21 touches the bottom portion 48 of solvent container 41, to a high height where a sidewall 29 of solute cup 21 barely touches a sidewall 49 of solvent container 41.

Cup 21 and container 41 in FIG. 1A are both made from rigid and impermeable materials. They both have a fixed shape, and therefore a fixed volume. Cup 21, container 41 and their alternative embodiments can hold contents in many states of matter including gas, solid and liquid. In this embodiment, cup 21 and container 41 are liquid-impermeable, and the present disclosure will primarily focus on the use of solids and liquids as solutes and solvents. However, principles behind the universal mixture maker is applicable directly to gas and gas-impermeable vessels as well. Sidewalls 29 and 49 are either transparent or translucent, such that solutes and solvents they hold can be seen through. Furthermore, a solute inside cup 21 is visible not only through sidewall 29, but also through sideway 49 of container 41, when cup 21 is placed inside container 41. A solute inside cup 21 continues to be visible even when container 41 is filled with a solvent and cup 21 is submerged in said solvent, as long as said solvent is sufficiently transparent. Transparency is one way a universal mixture maker provides visual indications of surface levels of solutes and solvents held in cups and containers. Bottom portions 28 and 48 are rectangular in the first embodiment shown in FIG. 1A. But they can be of any shape. And in some other embodiments a bottom portion 28 or 48 may be very small, and even near non-existent.

Figures 1B, 1C:
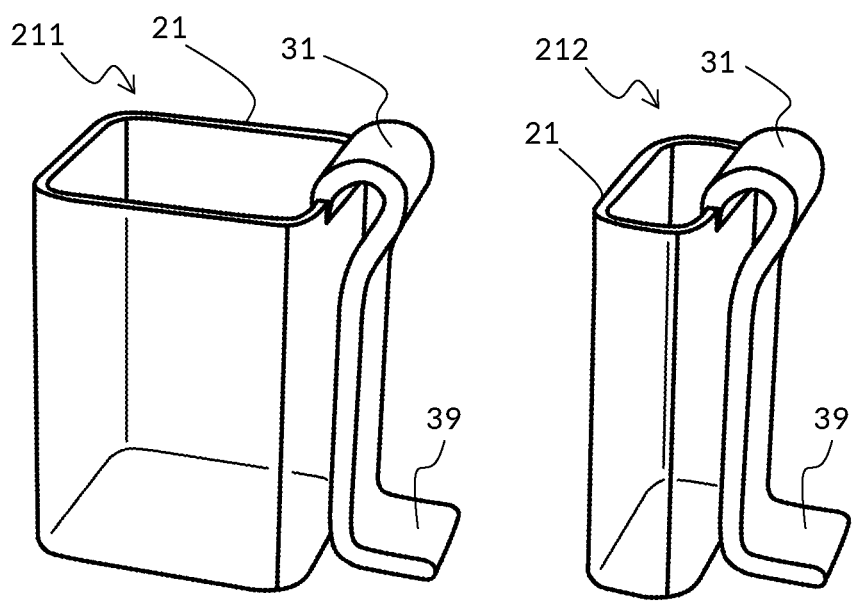
FIG. 1B is a perspective view of a solute cup model 211 of the first embodiment, for making a 12 wt % NaCl solution from a 26 wt % stock.
FIG. 1C is a perspective view of a solute cup model 212 of the first embodiment, for making a 3.5 wt % NaCl solution from a 26 wt % stock.

FIG. 1B and FIG. 1C illustrate two solute cups 21 in the first embodiment. They share similar design characteristics, but have different fixed volumes. FIG. 1B shows a solute cup model 211 which is larger in size than the solute cup model 212 shown in FIG. 1C. In this embodiment, solute cups 21 shown in FIG. 1B and FIG. 1C have the same hexahedron shape as solvent container 41 shown in FIG. 1A. But in general, solute cups do not need to have the same polyhedron shape as a solvent container that receives them. Solute cups only need to shaped and sized to be placeable inside a solvent container. Retaining members 31 of both solute cups terminate in an adjustment tab 39 which can be used by an operator to adjust the height of a cup that is clipped via said retaining member 31 onto a sidewall of solvent container 41.

Solute cup model 211 in FIG. 1B is designed to hold saturated saline solution at 26 wt %, and when used with solvent container 41 of universal mixture maker 110, allows easy measurement of 26 wt % saline as a solute and water as a solvent, to produce an output solution of 12 wt % dilution which turns into slushy saline ice in a typical consumer freezer set to 0° F. Solute cup model 212 in FIG. 1C, on the other hand, produces a 3.5 wt % dilution (the salinity of seawater), from the same 26 wt % saline as input solute.

Solute cup models 211 and 212 are examples where a solute cup 21 is designed to take one exact type of input solute (i.e. 26 wt % saline), to be used with one exact type of input solvent (i.e. water), and to make one exact output mixture with one exact output concentration level. With cup models 211 and 212, the output mixture is a true solution, and will be referred to as an output solution. An input combo refers to a pair of solute type and solvent type. For cup models 211 and 212, the input combo is 26 wt % salt water (i.e. NaCl(aq) as solute) and water (H$_2$O as solvent). An input combo alone can determine the output mixture type or output solution type which is NaCl(aq) for cup models 211 and 212. A triplet of 1) an input combo, 2) a measured volume for the solute, and 3) a measured volume for the solvent determine the output concentration level of said output mixture type. For input combo other than NaCl(aq) and H$_2$O, different solute cup models are needed. However, the same iterative method is universally applied to any solute cup models, as will be discussed shortly.

Solute cup models 211 and 212 shown in FIG. 1B and FIG. 1C are thus designed for very specific scenarios. Other embodiments of the universal mixture maker may use a variety of designs where solute cups and solvent containers accommodate multiple input solute types, multiple input solvent types, multiple output concentration units, and/or multiple output concentration values.

Solute cups 21 in FIG. 1B and FIG. 1C may be marked with their input combo and their respective output concentration levels, for identification. But otherwise they do not need to have other markings on them, for them to be useful. Similarly, solvent container 41 in FIG. 1A does not need to have any markings on it for it to be useful, as will shortly be demonstrated. However, other embodiments of the universal mixture maker may have volumetric, concentration, mixture, and other markings on them. Despite these differences in markings, the same iterative method universally applies to all embodiments.

Figure 1D:
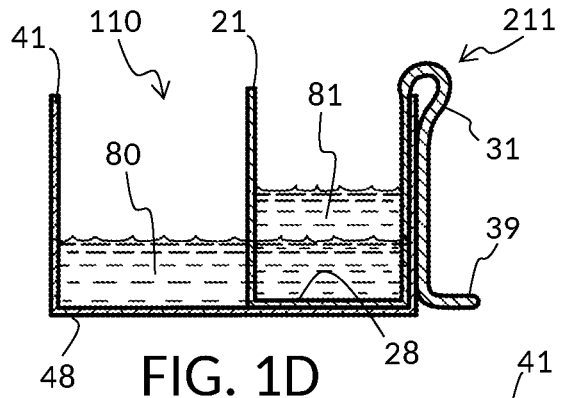
FIG. 1D illustrates the first step of a first operation of mixture maker 110 using solute cup model 211 from FIG. 1B, to produce a 12 wt % NaCl dilution from one bowl of saturated 26 wt % saline stock. There isn't enough water given the one bowl of 26 wt % saline stock.

FIG. 1D, FIG. 1E, FIG. 1F and FIG. 1G illustrate a first operation of universal mixture maker 110. Solute cup model 211 is used with solvent container 41 to produce a 12 wt % dilution from one bowl of saturated 26 wt % saline stock 81. That is, the variable for solute volume in mixture equations is assigned a known value of one bowl of saturated saline stock. An operator first places cup 21 inside container 41 such that bottom portion 28 of cup 21 touches bottom portion 48 of container 41, as illustrated in FIG. 1D. Cup 21 is designed specifically to convert an input 26 wt % saline to an output 12 wt % dilution. And it requires that the operator adjust the its height by tab 39, until its bottom portion sits on the bottom portion of container 41 as described. The operator lets go of cup 21, and its retaining member 31 will clip cup 21 securely to a sidewall of container 41. Cup 21 may be clipped to any sidewall of container 41.

Figure 1E:
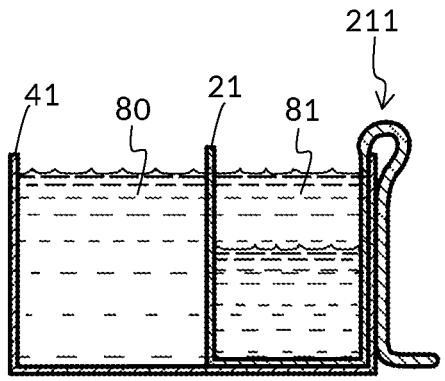
FIG. 1E illustrates the second step following FIG. 1D, where too much water is poured into the solvent container.
Figure 1F:
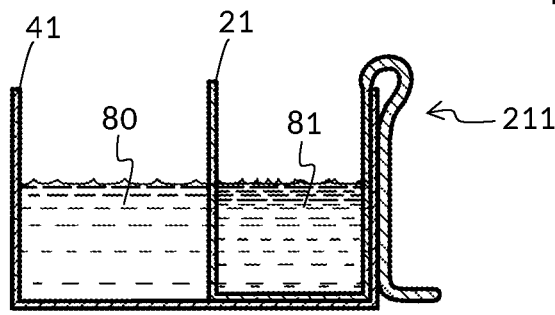
FIG. 1F illustrates the third step following FIG. 1E, where water level aligns with saline solute level.
Figure 1G:
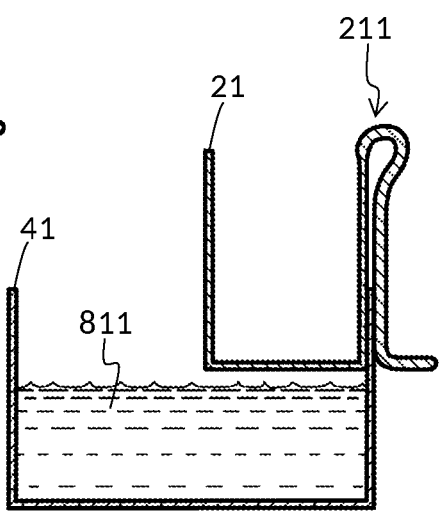
FIG. 1G illustrates the fourth step following FIG. 1F, where measured amount of water is mixed with one bowl of 26 wt % saline stock to produce a 12 wt % NaCl solution.

Continuing with FIG. 1D, the operator pours one bowl of 26 wt % saline as solute 81 into cup 21, and then some other amount of water as solvent 80 into container 41. Surface levels of water solvent 80 and saline solute 81 can be observed through transparent sidewalls of both vessels. The operator compares these surface levels, and determines that there is not enough water solvent 80 to match saline solute 81. This mismatch of surface level indicates that the right output concentration level has not yet been achieved. In this case, there is less solvent than solute, thus a mixture of the two would be too concentrated. The operator proceeds to pour more water solvent 80 into container 41, and ends up with more water solvent 80 than saline solute 81, as shown in FIG. 1E. The operator syphons out or scoop up some water solvent 80, such that the level of solvent 80 lines up with the level of solute 81, as shown in FIG. 1F. Now the desired output concentration of 12 wt % has been achieved. Solute 81 may now be poured from cup 21 into container 41, forming an output solution 811 of 12 wt % salinity, as shown in FIG. 1G. The output solution 811 made from previously separate solute 81 and solvent 80 may now be emptied from container 41.

For this scenario, the operator does not need to know exact amounts of solvent 80 and solute 81 shown in FIG. 1F. And indeed neither cup 21 nor container 41 in this embodiment provides volumetric markings in standard units. Actual volumes of solvent 80 and solute 81 do not matter. As long their surface levels align, the operator knows that a mixture of these two will produce the right output concentration level, with a measurement error rate specific to the pair of solute cup model 211 and solvent container 41. Cup model 211 and container 41 are designed and manufactured as fixed-shape vessels, based on theoretical calculations and empirically-confirmed refinements to provide a consistent concentration ratio between solute 81 and solvent 80, as long as their surface levels align. Such calculations and refinements take into account the thickness of sidewalls of cup 21, for instance, since these sidewalls displace water solvent 80 when cup 21 is submerged in water solvent 80. Sidewalls, therefore, do not affect the accuracy of measured concentration. However, in this first embodiment, the thickness of the bottom portion of cup 21 does cause an appreciable measurement error, when very small quantity of solvent and/or solute are used. This bottom-thickness issue may be mitigated by showing a mark for a minimum fill line on both vessels above which measurement error rate becomes acceptable. In other embodiments, this bottom-thickness issue is rectified by a substantial reduction of the bottom portion.

Figure 1H:
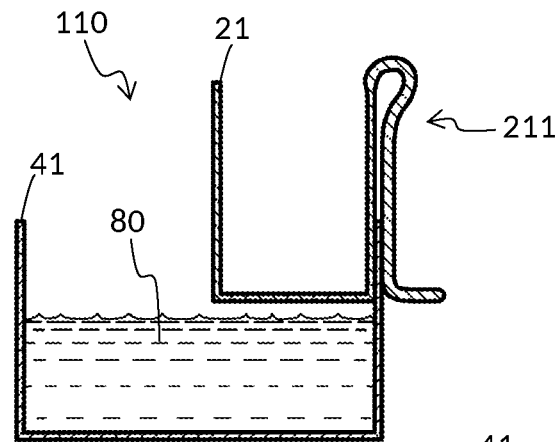
FIG. 1H illustrates the first step of a second operation of mixture maker 110 using solute cup model 211 from FIG. 1B, to make exactly one kettle of 12 wt % saline solution. In this first step, one kettleful of water is poured into a solvent container.
Figure 1J:
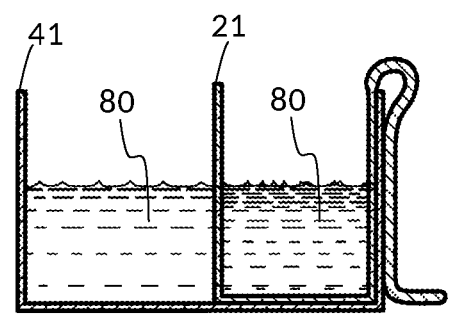
FIG. 1J illustrates the second step following FIG. 1H, where water from the solvent container is scooped into the solute cup until water levels in both align.
Figure 1K:
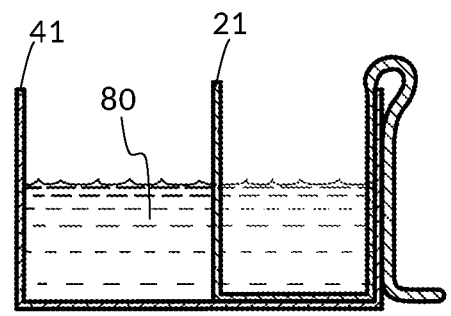
FIG. 1K illustrates the third step following FIG. 1J, where the solute cup is emptied of water.
Figure 1L:
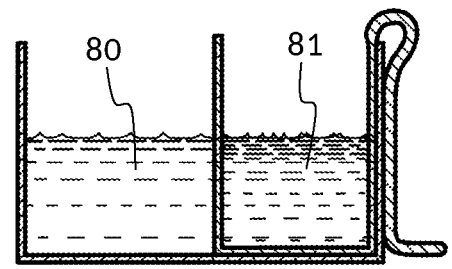
FIG. 1L illustrates the fourth step following FIG. 1K, where 26 wt % saline stock is poured into the solute cup until water level and saline stock align.

FIG. 1H, FIG. 1J, FIG. 1K and FIG. 1L illustrate a second operation of universal mixture maker 110. In this scenario, an operator wishes to make exactly one kettle of 12 wt % saline solution. That is, the variable for solution volume in mixture equations is assigned a known value of one kettle. The operator does not know at first the amount of water solvent needed. However, it will be not be more than the output volume which is one kettle. Thus the operator first pours one kettleful of water solvent 80 into solvent container 41, as shown in FIG. 1H. Solute cup 21 of solute cup model 211 remains above water and securely fastened to a sidewall of container 41. The operator then lowers and fastens cup 21 onto container 41, and scoops some water solvent 80 from container 41 into cup 21, such that the level of water solvent 80 in both vessels align, as shown in FIG. 1J. The operator empties cup 21 of its water solvent 80, leaving only container 41 holding water solvent 80, as shown in FIG. 1K. The operator now pours 26 wt % saline as solute 81 into cup 21, carefully stopping as the level of solute 81 reaches the level of water solvent 80, as shown in FIG. 1L. When the thus-measured solute 81 is mixed with solvent 80, exactly one kettleful of 12 wt % saline solution is produced.

The two scenarios illustrated above share common steps in their manual and iterative search for the right measurements of solute and solvent, despite their different goals. These common steps may be performed in different orders when using exactly one bowl of solute in the first scenario, versus when making exactly one kettle of output solution in the second scenario. Nevertheless, they are the same steps of an iterative method at the heart of the present disclosure. These steps of the iterative method comprise: a) adding a solute into a solute cup, b) removing a portion of said solute from said solute cup, c) adding a solvent into a solvent container, d) removing a portion of said solvent from said solvent container, e) submerging said solute cup in said solvent, f) adjusting submersion level of said solute cup, g) fastening said solute cup to said solvent container via a retaining member, and h) comparing the surface level of said solvent to the surface level of said solute. Some steps are repeated in this iterative process, until the operator has achieved desired results.

Figure 1M:
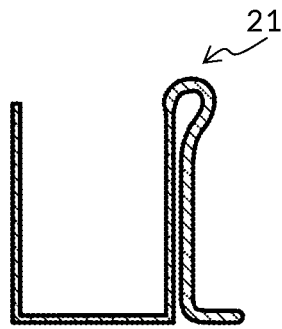
FIG. 1M illustrates a cross-sectional view of the solute cup model 211 from FIG. 1B, which is capable of taking an input solute of 26 wt % saline stock, to produce a 12 wt % dilution.
Figure 1P:
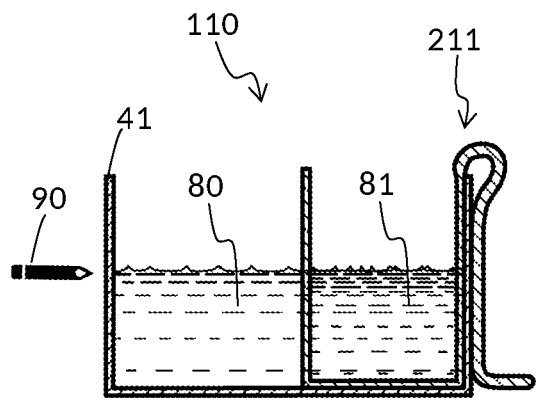
FIG. 1P illustrates the first step of a third operation of mixture maker 110 using solute cup model 211 from FIG. 1M and solute cup model 213 from FIG. 1N, to produce one kettle of a solution containing 12 wt % NaCl and 20 vol % glycerol. In the first step, an amount of 26 wt % saline stock is measured as per the second operation, enough to produce a 12 wt % dilution for an output solution amount of one kettle, except the solute is not mixed with the solvent. A pen is used to mark the level of the output solution.
Figure 1N:
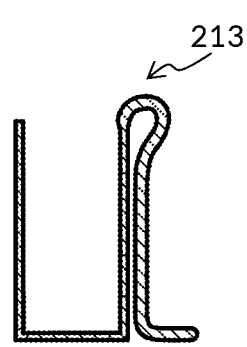
FIG. 1N illustrates a cross-sectional view of a solute cup model 213, which is capable of taking an input solute of 100 vol % glycerol, to produce a 20 vol % dilution.

FIG. 1M and FIG. 1N illustrate two solute cups used in a third operation of universal mixture maker 110, producing one kettle of a solution containing 12 wt % NaCl and 20 vol % glycerol. That is, the variable for solution volume in mixture equations is assigned a known value of one kettle, as in the second scenario. However, there are two solute equations in this third scenario, with two concentration levels being assigned known, desired values. Solute cup model 211 in FIG. 1M is the same model shown in FIG. 1B, capable of taking an input solute of 26 wt % saline stock to produce a 12 wt % dilution. Solute cup model 213 in FIG. 1N is capable of taking an input solute of 100 vol % glycerol to produce a 20 vol % dilution.

FIG. 1P illustrates the first step of the third operation of universal mixture maker 110. An operator first follows steps of the second operations illustrated in FIG. 1H, FIG. 1.1, FIG. 1K and FIG. 1L in order to measure an appropriate amount of 26 wt % saline stock, but stops short of mixing measured solute 81 with water 80. The end result is as shown in FIG. 1P, where cup model 211 holds the measured amount of saline solute 81. The operator takes a marker pen, and makes a pen mark 90 on a sidewall of container 41 indicating the current observed level of solvent 80. This mark 90 represents one kettleful of output solution in container 41. Cup model 211 is temporarily set aside, with solute 81 in it.

Figure 1Q:
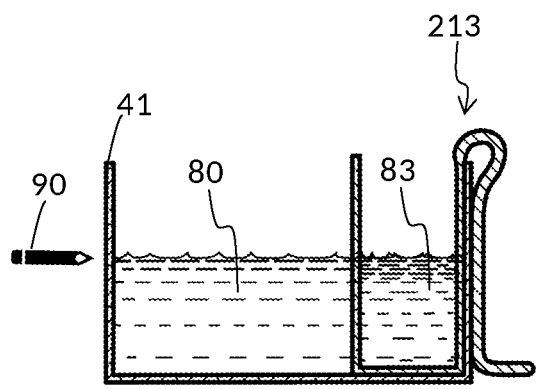
FIG. 1Q illustrates the second step following FIG. 1P, where an amount of 100 vol % glycerol is measure, but not mixed, to produce a 20 vol % dilution for same one kettle of output solution amount.

FIG. 1Q illustrates the second step of the third operation. An operator follows a similar procedure as above, to measure the right amount of glycerol solute 83. Alternatively, the operator can rely on pen mark 90 as a target level, and simply fill container 41 with water solvent 80 and cup model 213 with glycerol solute 83 to said target level.

Figure 1R:
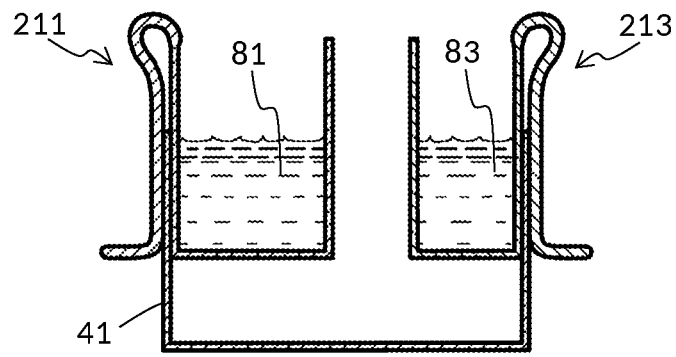
FIG. 1R illustrates the third step following FIG. 1Q, where measured saline stock and measured glycerol stock are shown against an empty solvent container.
Figure 1S:
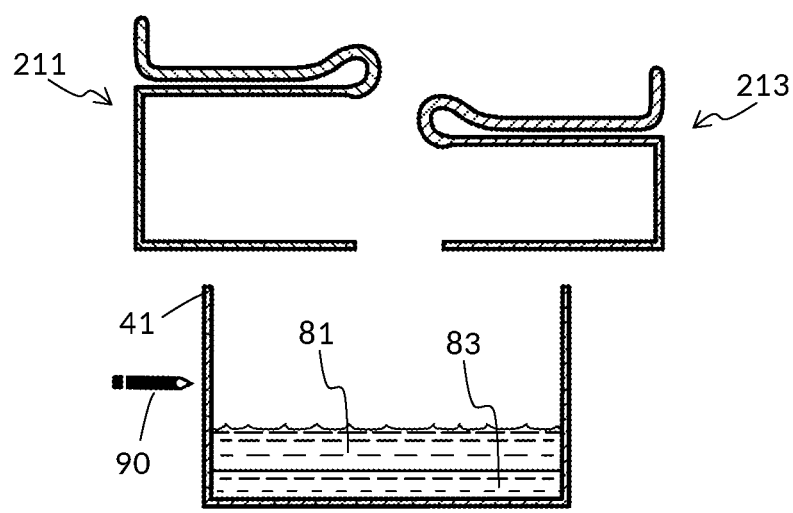
FIG. 1S illustrates the fourth step following FIG. 1R, where both saline stock and glycerol stock are poured into the solvent container. This combined liquid is short of the pen mark indicating the target level of the output solution.
Figure 1T:
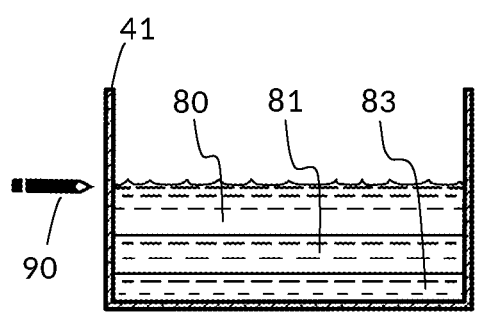
FIG. 1T illustrates the fifth step following FIG. 1S, where enough water is poured in to reach the target level of the output solution.
Figure 1U:
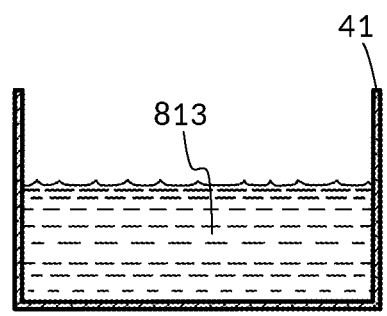
FIG. 1U illustrates the sixth step following FIG. 1T, where three liquids are mixed to produce one kettle of a solution containing 12 wt % NaCl and 20 vol % glycerol.

FIG. 1R, FIG. 1S, FIG. 1T and FIG. 1U illustrates the rest of steps in the third operation. In FIG. 1R, cup model 211 holds measured solute 81, and cup model 213 holds measured solute 83. Both cups are fastened to container 41. Both solute 81 and solute 83 are poured out of cups into container 41, as shown in FIG. 1S. Combined amount of solute 81 and solute 83 do not reach the pen mark 90. The operator now pours water solvent 80 into container 41 until the water level reaches pen mark 90, as shown in FIG. 1T. Solutes and solvent are thoroughly mixed to produce output solution 813 in container 41, as shown in FIG. 1U. The third operation demonstrates that a simple setup of solute cups in a solvent container is capable of producing an output solution with multiple solutes each measured to a desired concentration level.

Universal mixture maker 110 and the iterative method can be used to measure not only liquids as demonstrated, but also solids. This works for both soluble solids such as sugar and baking powder that dissolve in a solvent, as well as insoluble solutes that do not dissolved in a solvent, such as flour, rice, beans, seeds, grapes, berries, etc. The latter insolubles tend to accommodate large amount of liquid solvents in voids between granules, in a resulting mixture. Thus the volume of a resulting mixture may not be a simple sum of the volume of the solvent and the volume (including voids between granules) of solute granules. For some insoluble scenarios, this reduced volume in an output mixture is not important. For other scenarios, this volume reduction needs to be accounted for in the measuring process. Solute cups for measuring these solid granules can be designed for common granule sizes. Their designs can take into account known voids between granules given a known granule size. Solute cups can thus be used to measure a volume of granules that is equivalent to a desired mass of the same granules, removing the traditional need for weighing scales, from the process of mixture making. Solids may be measured not only as solutes, but also as a solvent, such as when measuring an egg yolk solute for use with a flour solvent. Similarly, many types of liquid can be used as a solute or as a solvent, including flavoring extracts, milk, molasses, cooking oils, etc. Furthermore, as has been demonstrated, solid solutes such as salt may be measured volumetrically as a saturated aqueous liquid of known 26 wt % concentration. Measurement of a saturated liquid is more accurate than measurement by volume of equivalent solid granules, as granules may not all have identical shapes and sizes for an accurate mass-to-volume conversion.

Second Embodiment

FIG. 2A illustrates the second embodiment of the present disclosure, a universal mixture maker 120. The instrument comprises two solute cups 22 for holding two solutes, and a solvent container 42 for holding a solvent. Solvent container 42 comprises four sidewalls 49, and a bottom portion 48. Each solute cup 22 comprises four sidewalls 29 and a bottom portion 28. A retaining member 32 is provided in the form of a C-clamp, with a fastening knob 38. Retaining member 32 is capable of fastening a solute cup 22 to a sidewall 49 of container 42, at a desired height. As shown in FIG. 2A, both solute cups 22 can be submerged in container 42 at the same time.

FIG. 2B and FIG. 2C illustrate two solute cups 22 in the second embodiment. They share the same hexahedron design, but have different fixed volumes. Solute cup model 221 in FIG. 2B is designed to measure a saturated 26 wt % stock for an output saline solution at 12 wt %. Solute cup model 222 in FIG. 2C is designed to measure a 100 vol % glycerol input solute for an output glycerol solution at 10 vol %.

FIG. 2D illustrates retaining member 32 with a fastening knob 38. The same retaining member 32 can be used fasten either solute cup model 221 or solute cup model 222. The universal mixture maker 120 thus allows one, two or even more solute cups of the same design to be submerged in it at the same time, in an interchangeable and modular fashion. Retaining member 32 is a removably engageable member in this embodiment. It can be detached from both a solute cup and a solvent container. As a result, retaining member 32 may be used with any of the four sidewalls 29 of a solute cup 22 shown in FIG. 2A.

The second embodiment adds volumetric indicia on sidewalls of both solvent container 42 and on solute cup 22, as illustrated in FIG. 2A, FIG. 2B and FIG. 2C. Solvent container 42 in FIG. 2A provides volumetric indicia 91 with mixture markings showing the amount of solution or mixture contained in it. The top most mixture marking represents a max fill line 92, showing 1000 mL as the capacity of container 42. The bottom most mixture marking represents a minimum fill line 93, showing the minimum amount of solution needed for measurement error rate to be within an acceptable range. Solute cup model 221 in FIG. 2B provides volumetric indicia 91 with solute markings showing the amount of solute contained within it. Solute cup model 222 in FIG. 2C similarly provides volumetric indicia 91. In this embodiment, solute cups do not provide max fill lines or minimum fill lines. Volumetric indicia 91 may be provided on any or all four sidewalls of a solute cup, or of a solvent container. An operator may choose any sidewall of a solute cup for clamping, via retaining member 32, to any sidewall of a solvent container, in order to maximize visibility of volumetric indicia.

Figure 2E:
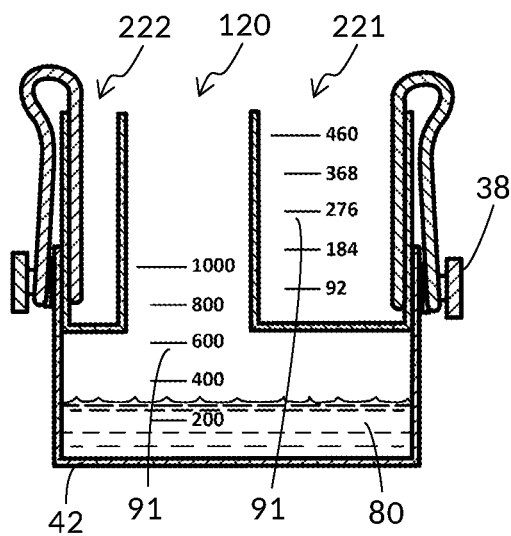
FIG. 2E illustrates the first step of a first operation of mixture maker 120 using solute cup model 221 from FIG. 2B and solute cup model 222 from FIG. 2C, to produce an output solution containing 10 vol % glycerol and 12 wt % NaCl, with exactly 300 mL of water solvent. In this first step, 300 mL water is poured into the solvent container.
Figure 2F:
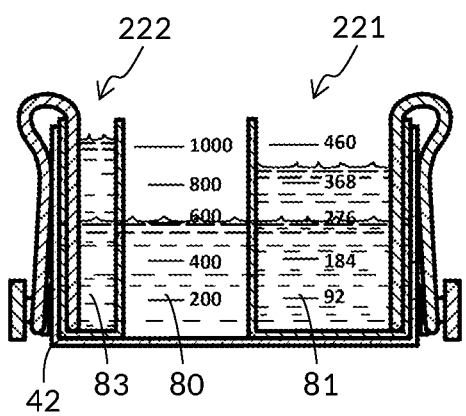
FIG. 2F illustrates the second step following FIG. 2E, where solute cups filled with solutes are lowered into the solvent container, and it is determined that too much solutes exist in solute cups.
Figure 2G:
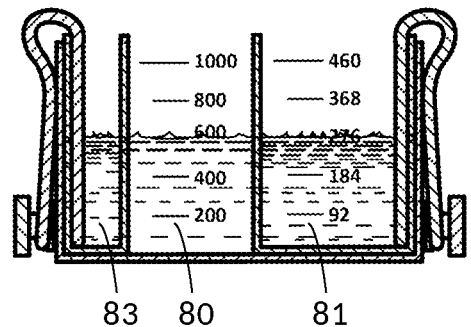
FIG. 2G illustrates the third step following FIG. 2F, where extraneous solutes are scooped out until solute levels align with the risen water level.
Figure 2H:
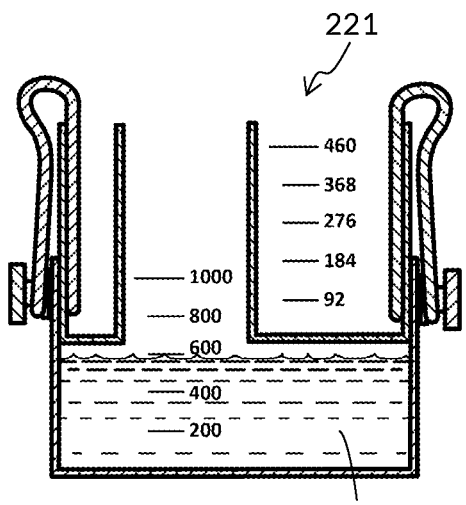
FIG. 2H illustrates the fourth step following FIG. 2G, where measured solutes are mixed with 300 mL of water to produce an output solution containing 10 vol % glycerol and 12 wt % NaCl.

FIG. 2E, FIG. 2F, FIG. 2G and FIG. 2H illustrate a first operation of universal mixture maker 120. In this first scenario, an operator wishes to use exactly 300 mL of water solvent to produce an output solution containing 10 vol % glycerol and 12 wt % NaCl. That is, the variable for solvent volume in mixture equations is assigned a known value of 300 mL. The operator first lifts cup model 222 and cup model 221 up away from the bottom of container 42, as shown in FIG. 2E. These two cup models are fastened to sidewalls of container 42 with fastening knobs 38. The operator pours water into container 42 until the water level aligns with the 300 mL mixture marking of volumetric indicia 91 of container 42, as shown in FIG. 2E. The operator lowers both solute cups such that their bottom portions touch the bottom portion of container 42. These solute cups are fastened again to the sidewall of container 42. As shown in FIG. 2F, the observed level of water solvent 80 has risen to slightly more than 600 mL, as a result of water displacement by both cup model 222 and cup model 221. This new water level represents the output mixture volume. The operator pours 100 vol % glycerol solute 83 into cup model 222, and 26 wt % saline solute 81 into cup model 221. FIG. 2F shows a configuration where the operator pours too much solute 83 and solute 81, such that their levels are higher than that of water solvent 80. Extra solute 83 and solute 81 are scooped out, such that levels of solute 83, solute 81 and solvent 80 align, as shown in FIG. 2G. The operator mixes all three into an output solution 821 with 10 vol % glycerol and 12 wt % NaCl, as shown in FIG. 2H.

Compared to the first embodiment, the second embodiment enables further measuring capabilities with the addition of volumetric indicia 91 in container 42, and volumetric indicia 91 in cup model 221, as shown in FIG. 2E. These indicia and their markings allow an operator to measure an exact amount of solute, solvent or solution. That is, an operator can assign an exact amount to a volumetric variable in mixture equations. For instance, indicia shown on a sidewall of container 42 in FIG. 2E indicate that a water volume of exactly 300 mL is used, or assigned. These indicia allow the operator to find values of other variables, without solving analytic equations. For instance, in FIG. 2F, the level of water solvent 80 in container 42 has been pushed up by the introduction of cup models 221 and 222, slightly above the 600 mL label on a mixture marking. The operator thus finds the volume of the output solution. For instance, when the right solute amount is measured in FIG. 2G, it can be observed that cup model 221 holds solute 81 with a level slightly below the 276 mL label on a solute marking. The operator thus finds the volume of the solute required. Finally, FIG. 2H shows that the level of an actual output solution 821 has dropped slightly below 600 mL. This is due to the displacement by sidewalls and bottom portion of cup model 221, and the partial molar property, as has already been discussed. The displacement of the bottom portion is mitigated by the use of minimum fill line 93 shown in FIG. 2A. The max fill line 92 with a 1000 mL label in FIG. 2A, on the other hand, is used to prevent the use of too much solvent. The partial molar property issue only affects the final volume of output solution 821, and not the accuracy of the concentration levels of solutes in the output solution, because the design of cup model 221 has already taken partial molar property into consideration. Universal mixture makers prioritize accurate output concentration levels, thus sometimes an output solution such as solution 821 in FIG. 2H ends up having a final volume slightly less than the indicated 600 mL. This reduced volume is easily overcome by aiming for a slightly higher output volume such 610 mL throughout the abovementioned process. Despite difference in aimed output volumes, resulting concentration of an output solution would always be the same.

Regardless of the number of solutes used in the creation of a mixture or a solution, there are only a few types of variables in mixture equations, including solute volume, solvent volume, final mixture volume, and final solute concentration level. Sample scenarios of the first embodiment has demonstrated situations were a solute volume is assigned a known value, or the final mixture volume is assigned a known value. This first sample scenario of the second embodiment demonstrates a situation where the solvent volume is assigned a value of 300 mL using volumetric indicia 91 as shown in FIG. 2E. Despite different goals in these scenarios, the same iterative method is universally applied, and unknown variables visually and manually resolved, without requiring analytical equation-solving.

Figure 2J:
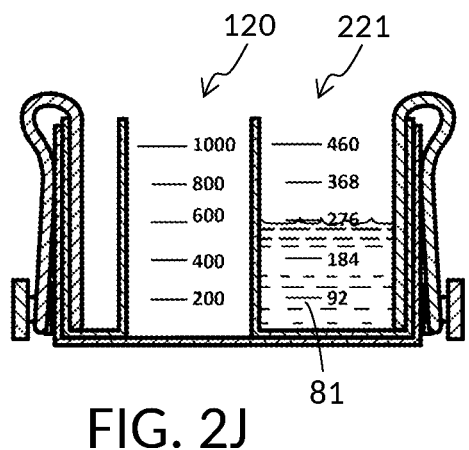
FIG. 2J illustrates the first step of a second operation of mixture maker 120 using solute cup model 221 from FIG. 2C and solute cup model 222 from FIG. 2D, to produce an output solution containing 10 vol % glycerol and 12 wt % NaCl, similar to the first operation, except that in this second operation exactly 257 mL of saturated 26 wt % NaCl stock is to be used. In this first step, solute cup model 221 is filled with exactly 257 mL of saturated 26 wt % NaCl stock.
Figure 2K:
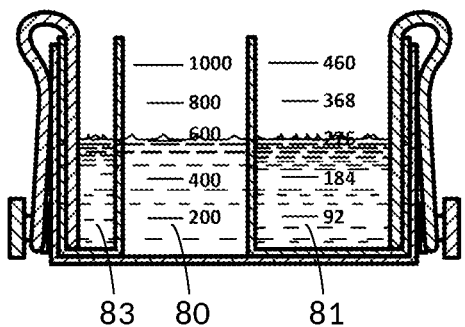
FIG. 2K illustrates the second step following FIG. 2J, where glycerol solute and water solvent are added to match the level of the NaCl solute, and all three liquids are now measured for mixing.

As a further confirmation of this universality, the first scenario can be altered by changing the assigned variable from solvent to the NaCl solute. In a second operation of universal mixture maker 120, instead of requiring 300 mL of water solvent, the operator requires exactly 257 mL of saturated 26 wt % solute 81 in cup model 221, as shown in FIG. 2J. The iterative method will find the same amount of glycerol solute 83, and 300 mL of water solvent 80, as shown in FIG. 2K which is identical to FIG. 2G. The two configurations in FIG. 2K and FIG. 2G result in the same output solution 821, with the same solute concentrations, and the same solution amount of slightly less than 600 mL as shown in FIG. 2H.

Figure 2L:
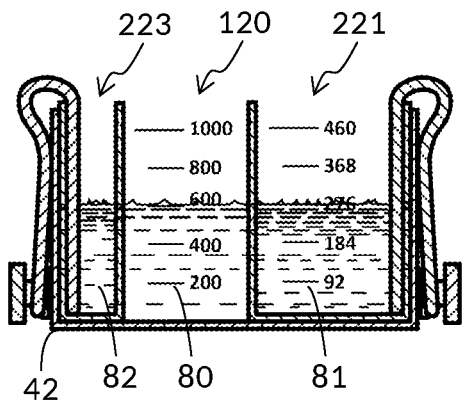
FIG. 2L illustrates the first step of a third operation of mixture maker 120 using solute cup model 221 from FIG. 2B for measuring a 12 wt % dilution from a saturated 26 wt % NaCl stock, and a solute cup model 223 for measuring a 3.5 wt % NaCl solution from a 5M stock, to produce an output saline solution of 15.5 wt % concentration. In this first step, all three liquids are measured iteratively such that their levels align.
Figure 2N:
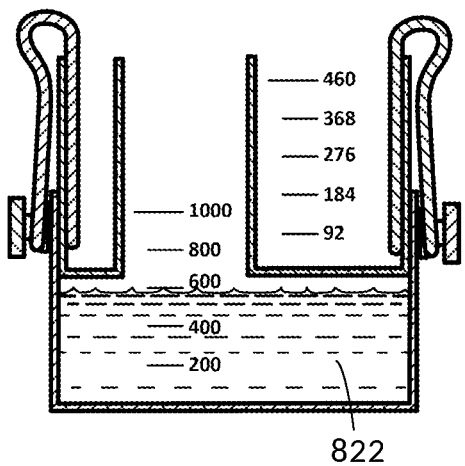
FIG. 2N illustrates the second step following FIG. 2L, where all measured liquids are mixed to produce an output solution of 15.5 wt % concentration from two different saline sources, 26 wt % NaCl stock and 5M NaCl stock.

FIG. 2L and FIG. 2N illustrates a third operation of universal mixture maker 120, producing an output saline solution of 15.5 wt % concentration. This configuration utilizes the same solute cup model 221 from previous scenarios to measure a solute for an output saline solution at 12 wt % from a saturated 26 wt % NaCl stock 81, as shown in FIG. 2L. The third scenario utilizes a new solute cup model 223 to measure a solute for an output saline solution at 3.5 wt % from a concentrated 5M NaCl stock 82, also shown in FIG. 2L. When water solvent 80 is added, and all three liquids have the same observed level, they can be mixed into an output saline solution 822 of 15.5 wt % NaCl concentration, as illustrated in FIG. 2N. Despite different solute sources (26 wt % NaCl stock for solute 81, and 5M NaCl stock for solute 82), cup models 221 and 223 produce dilutions in the same output unit of wt %. Thus 12 wt % and 3.5 wt % can be simply added to obtain the desired 15.5 wt % output concentration. The design of universal mixture maker 120 accommodates this by mechanically reducing the amount of solvent 80 needed in FIG. 2L, when both cup models 221 and 223 are submerged and fastened to container 42.

Figure 2P:
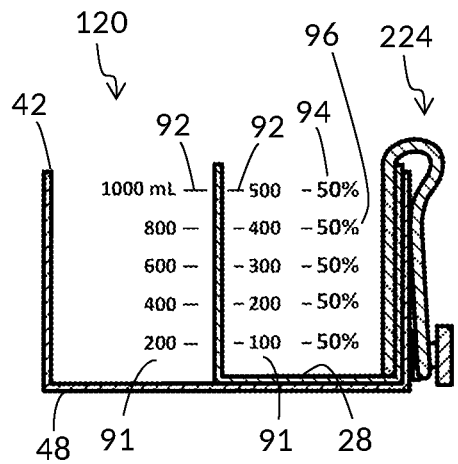
FIG. 2P is a cross-sectional view of a solute cup model 224 of the second embodiment which is capable of measuring a solute for a variable output concentration level from 7 vol % to 50 vol % using a 100 vol % glycerol stock. In this view, one calibrated indicia column is shown, showing how it can be used to measure glycerol for a 50 vol % concentration.

FIG. 2P, FIG. 2Q FIG. 2R and FIG. 2S illustrate a universal mixture maker 120 with a new solute cup model 224 which is able to hold 100 vol % glycerol, and produce diluted glycerol solutions of variable concentration levels ranging from 7 vol % to 50 vol %. Container 42 shown in FIG. 2P provides volumetric indicia 91 with mixture markings, where the top marking with the label "1000 mL" serves as a max fill line 92. Solute cup model 224 shown in FIG. 2P provides volumetric indicia 91 with solute markings, where the top marking with the number "500" (mL) serves as a max fill line 92. Solute cup model 224 also provides four calibrate indicia columns, one on each of its four sidewalls. The first indicia column 94 is shown in FIG. 2P, with calibrated markings 96 indicating an output concentration level of 50 vol %. When using this first indicia column 94, cup model 224 needs to be adjusted such that its max fill line 92 aligns with the max fill line 92 of container 42. When thus adjusted, the universal mixture maker 120 will produce an output solution of 50 vol %, when levels of solute and solvent line up, regardless of actual solvent amount and solute amount.

Figure 2Q:
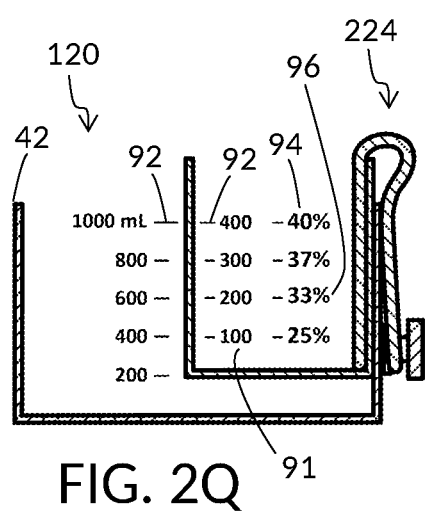
FIG. 2Q illustrates a second sidewall of cup model 224 where a different calibrated indicia column is shown which is able to measure glycerol for concentration levels ranging from 25% to 40%.

FIG. 2Q illustrates the second calibrated indicia columns 94 provided on a different sidewall of cup model 224. On this sidewall, the volumetric indicia 91 displays "400" (mL) as a max fill line 92, and not "500" (mL). When using this second indicia column 94, cup model 224 is adjusted such that the "400" (mL) max fill line 92 aligns with the max fill line 92 of container 42. The bottom portion of cup model 224 is no longer in contact with the bottom portion of container 42. When thus adjusted, the universal mixture maker 120 will produce an output solution with a solute concentration as indicated by calibrated markings 96 of indicia column 94. For instance, when container 42 is filled with a solvent to the mixture marking "600" (mL), and cup model 224 is filled with glycerol to the solute marking "200" (mL), then an output solution of 33 vol % glycerol can be made. The second indicia column 94 can be used to produce output concentrations ranging from 25 vol % to 40 vol %.

Figure 2R:
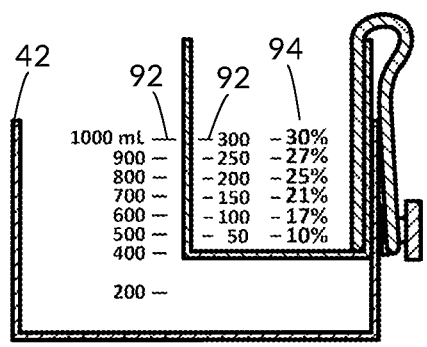
FIG. 2R illustrates a third sidewall of cup model 224 which can be used to measure glycerol for concentration levels ranging from 10% to 30%.
Figure 2S:
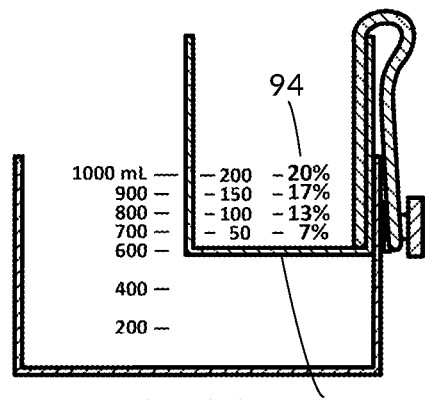
FIG. 2S illustrates a fourth sidewall of cup model 224 which can be used to measure glycerol for concentration levels ranging from 7% to 20%.

Similarly, FIG. 2R illustrates the third calibrated indicia column 94, for use when the max fill line 92 showing "300" (mL) is aligned with max fill line 92 of container 42. This indicia column can produce output concentrations from 10 vol % to 30 vol %. Lastly, FIG. 2S illustrates the fourth calibrated indicia column 94 which can produce output concentrations from 7 vol % to 20 vol %.

Figure 2T:
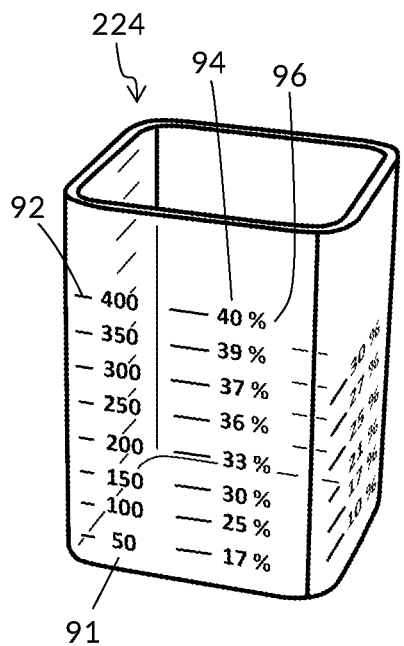
FIG. 2T is a perspective view of solute cup model 224 from FIG. 2P of the second embodiment, for measuring variable output concentration levels from 7 vol % to 50 vol % using a 100 vol % glycerol stock, showing calibrated indicia columns on its sidewalls.

FIG. 2T is a perspective view of solute cup model 224 from FIG. 2Q, showing calibrated indicia columns 94 on its sidewalls. The second calibrated indicia column 94 faces the viewer, with a max fill line 92 displaying "400" (mL), and a corresponding calibrated marking 96 showing 40 vol % next to the max fill line 92. The volumetric indicia 91 next to this indicia column 94 ends with "400" (mL) at the max fill line 92, because the solute cup should not be filled with solute beyond 400 mL, when using this second indicia column 94.

Figure 2U:
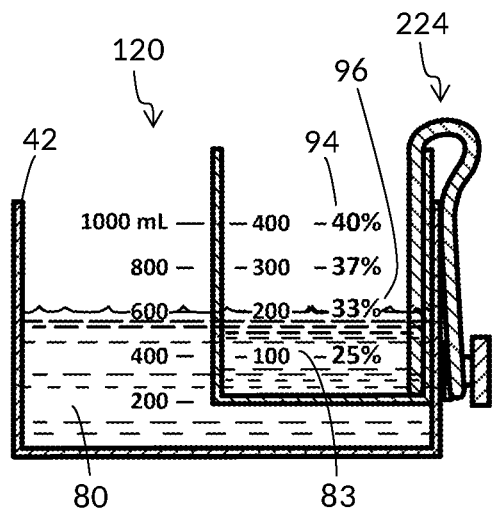
FIG. 2U illustrates a fourth operation of mixture maker 120 using solute cup model 224 from FIG. 2T, to produce a diluted glycerol solution of 33 vol %.

FIG. 2U illustrates a fourth operation of universal mixture maker 120, with the solute cup model 224. An operator wishes to produce a diluted glycerol solution of 33 vol %. Using the second calibrated indicia column 94, the operator identifies the calibrated marking 96 with "33%". The operator fills cup model 224 with glycerol solute 83 to the solute marking showing "200" (mL). The operator further fills container 42 with water solvent 80 to the mixture marking showing "600" (mL) such that water level aligns with glycerol level. Solute 83 can now be mixed with solvent 80 to produce an output solution of 33 vol % glycerol.

Figure 2W:
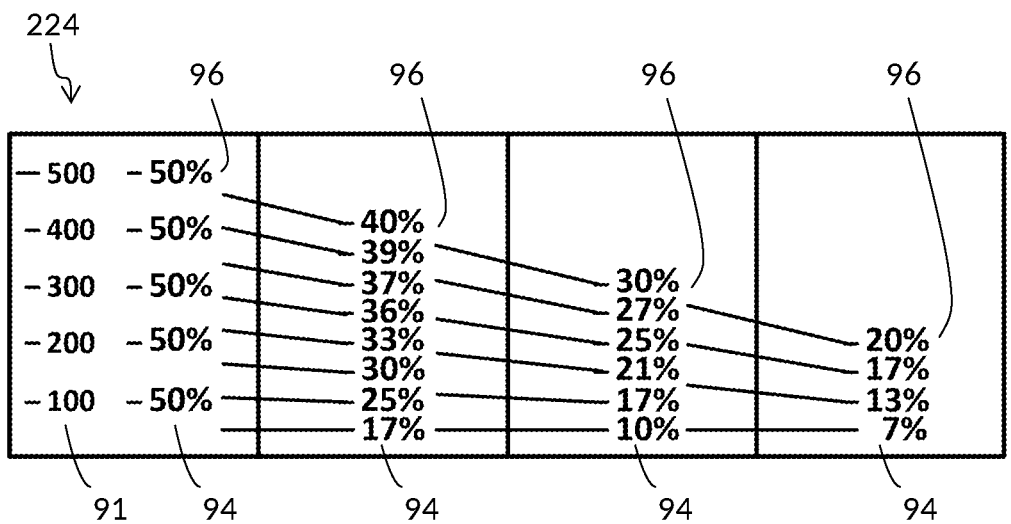
FIG. 2W illustrates an unfolded view of the outer surface of solute cup model 224 from FIG. 2T, showing four calibrated indicia columns connected by curve lines useful for interpolation.

FIG. 2W illustrates an unfolded view of the outer surface of solute cup model 224. The four rectangular panels represent the outer surface of the four sidewalls. Volumetric indicia 91 with solute markings are shown on the first sidewall, to the left of the first calibrated indicia column 94 where all calibrated markings 96 indicate 50 vol %. The second sidewall hosts the second indicia column 94 which can measure concentrations from 17 vol % to 40 vol %. The third indicia column 94 measures concentrations from 10 vol % to 30 vol %. Lastly, the fourth indicia column 94 measures from 7 vol % to 20 vol %. There are curved lines connecting calibrated markings 96 in one indicia column to a neighboring indicia column. These allow an operator to interpolate between percentage numbers shown in two indicia columns, in order to measure concentrations not explicitly labeled. When using interpolation, an operator will also interpolate the max fill line, and adjust the solute cup accordingly.

The addition of calibrated indicia columns 94 in solute cup model 224 enables a novel feature in universal mixture maker 120. Whereas solute cups described earlier were each designed to produce exactly one output concentration level, the solute cup model 224 is able to produce a range of output concentration levels. The same solute cup can be used to measure various output concentration levels ranging from 7 vol % to 50 vol %. In FIG. 2T, FIG. 2U and FIG. 2W, the fourth scenario of the second embodiment demonstrates a situation where an operator wishes to produce a dilution of 33 vol %. There is no need for the operator to procure a solute cup designed specifically for a 33 vol % output concentration level. One cup is sufficient for a wide range of concentration needs, including 33 vol %.

Figure 2X:
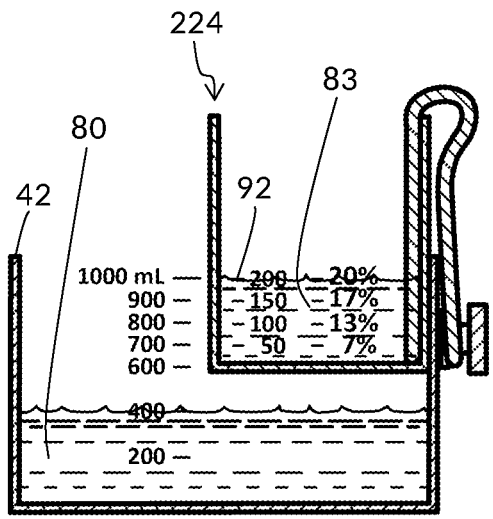
FIG. 2X illustrates the first step of a fifth operation of mixture maker 120 using solute cup model 224 from FIG. 2T, to find the vol % concentration of glycerol made with one bottle of 100 vol % glycerol and one big glass jar of water. In this first step, one bottle of glycerol is emptied into the solute cup, and one big glass jar of water is emptied into the solvent container.
Figure 2Y:
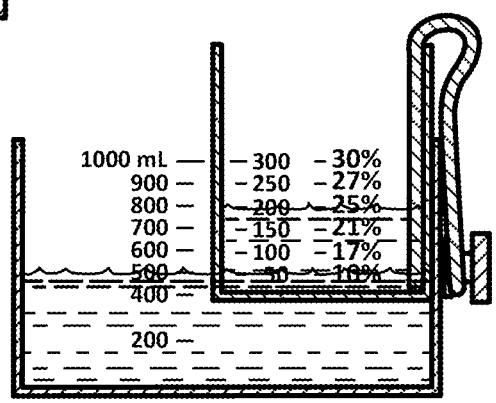
FIG. 2Y illustrates the second step following FIG. 2X, where a different calibrated indicia column is rotated into view to check for its fitness in measuring this pair of liquids.
Figure 2Z:
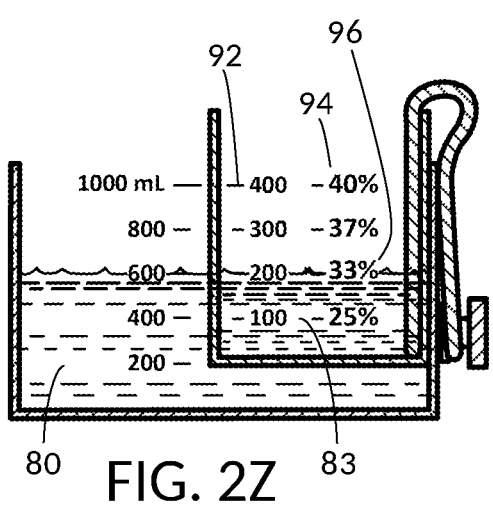
FIG. 2Z illustrates the third step following FIG. 2Y, where the calibrated indicia column showing a max fill line of 400 mL and max concentration of 40 vol % is found to be fit for measuring this pair of liquids. Once solute level aligns with water level, the concentration is found to be 33 vol %.

In fact, the addition of calibrated indicia columns can turn a universal mixture maker from a solute measuring instrument into a concentration finding instrument, illustrated in FIG. 2X, FIG. 2Y and FIG. 2Z. Imagine a fifth operation of universal mixture maker 120 shown in FIG. 2U being used as a concentration finder. A big bubble enthusiast has been making big bubble solutions by adding detergent to an exact glycerol dilution created by mixing one store-bought bottle of 100 vol % glycerol with one big glass jar of water. The enthusiast has good success with this formula consistently, and now wish to tell the world about this solution. To find the output concentration of glycerol, so that this dilution can be made for different output volumes, the operator first pours one glass jar of water 80 into container 42, and a bottle of 100 vol % glycerol 83 into solute cup model 224, a shown in FIG. 2X. Initially, the operator starts with the indicia column with a 200 (mL) max fill line 92. The levels of water 80 and glycerol 83 are far apart. The operator rotates the solute cup such that a different indicia column is facing her, as shown in FIG. 2Y. Levels of water and glycerol are still not aligned. The operator further lowers the solute cup, and switches to a sidewall showing indicia column 94 with a 400 (mL) max fill line 92, as shown in FIG. 2Z. Now water 80 and glycerol 83 line up perfectly. The calibrated marking 96 on indicia column 94 reads 33 vol %. Thus the operator now knows the glycerol concentration of her glycerol dilution. Of course, if the actual concentration level is not a percentage number printed on the solute cup, interpolation can be carried out as described earlier using curved lines shown in FIG. 2W.

In the fifth scenario of the second embodiment, the operator has assigned fixed values to both solute volume and solvent volume. While the operator did not have a "known value" for either of them, she could still use the universal mixture maker to find the concentration level. With that being said, if desired, she could also optionally read measured volumes from volumetric indicia, once these liquids are poured into container 42 and cup model 224 as shown in FIG. 2Z.

Solute cup model 224 needs to be submersible, adjustable and fastenable such that its bottom portion 28 can be positioned within a substantial range between max fill line 92 of container 42 and bottom portion 48 of container 42, as shown in FIG. 2P, FIG. 2Q, FIG. 2R and FIG. 2S. A wide submersible range enables a large range for concentration finding. But in this embodiment, bottom portion 28 of cup model 224 only needs to travel within approximately 60% of the range between max fill line 92 and bottom portion 48 of container 42, as shown in FIG. 2P and FIG. 2S.

Cup model 224 can be continuously adjusted for different levels of submersion, within this large submersible range. But in practice, with the hexahedron design of cup model 224, only four discreet levels corresponding to the four max fill line 92 on the four sidewalls of cup model 224 are generally used in the fourth operation of the second embodiment.

Third Embodiment

Figure 3A:
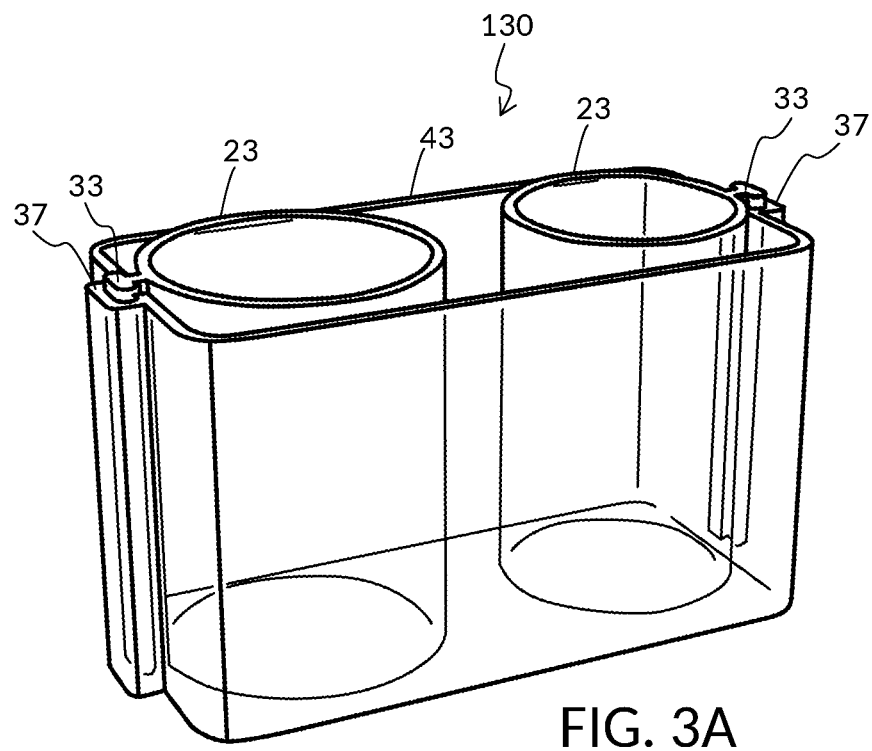
FIG. 3A is a perspective view of the third embodiment of the present disclosure, showing a universal mixture maker 130 with two cylindrical solute cups, a hexahedron solvent container, and a T-slot/T-slide retaining mechanism that can fasten said cups to said container.

FIG. 3A illustrates the third embodiment of the present disclosure, a universal mixture maker 130. The instrument comprises two cylindrical solute cups 23, and a solvent container 43. Each solute cup 23 is provided with a retaining member in the form of a T-slide 33 which spans the entire height of the cup. Solvent container 43 is provided on opposite sidewalls each with a T-slot 37 which is capable of receiving a T-slide 33. Both T-slot 37 and T-slide 33 are made of a material that provides enough friction to effectively fasten a solute cup to container 43, when an operator stops sliding said solute cup on the T-slot, after adjusting the height of the solute cup to a desired level. As shown in FIG. 2A, both solute cups 23 can be submerged in container 43 at the same time.

Figure 3B:
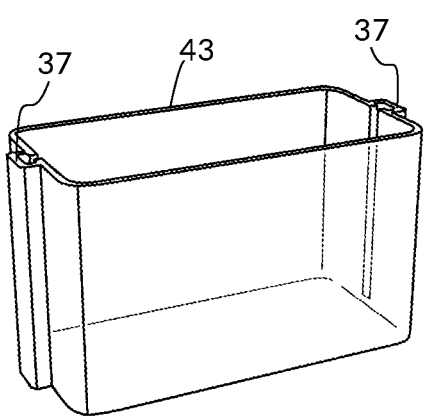
FIG. 3B is a perspective view of a solvent container of the third embodiment, with two T-slots for receiving T-sliders from compatible solute cups of the third embodiment.
Figures 3C, 3D:
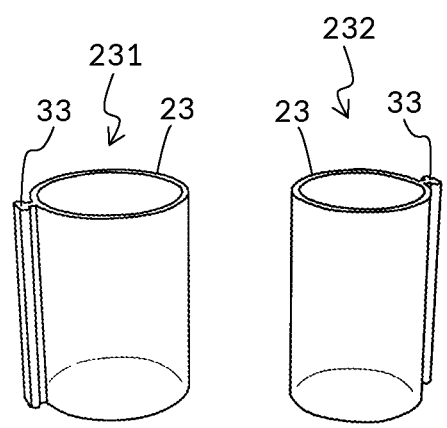
FIG. 3C is a perspective view of a solute cup model 231 of the third embodiment, for generic measuring of 30 vol % over a wide range of solutes, including long grain white rice as solid granules.
FIG. 3D is a perspective view of a solute cup model 232 of the third embodiment, for generic measuring of 20 vol % over a wide range of solutes, including milk as a liquid solute.

FIG. 3B illustrates the solvent container 43 without any solute cups engaged to it. Two T-slots 37 are located opposite each other. FIG. 3C and FIG. 3D illustrate two modular solute cups that can be fastened to container 43 via their respective T-slide 33, using either one of the two T-slots 37 on container 43. These two cups provide generic volume-to-volume percent measurement of solutes, suitable for common kitchen ingredients such as long grain white rice and milk. When used with container 43, solute cup model 231 shown in FIG. 3C measures a mixture with 30 vol % concentration of solute, with the cup 23 placed with its bottom portion touching the bottom portion of container 43, as shown in FIG. 3A. Similarly, solute cup model 232 shown in FIG. 3D measures 20 vol % concentration of solute.

Figure 3E:
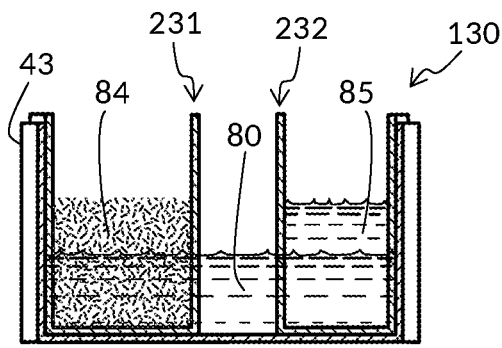
FIG. 3E illustrates the first step of a first operation of mixture maker 130 using solute cup model 231 from FIG. 3C and solute cup model 232 from FIG. 3D, to measure rice in a 3:5 ration to water, and milk in a 2:5 ratio to water, which is equivalent to measuring 30 vol % rice and 20 vol % milk against a total solution volume of 10 units (2+3+5). In this first step, desired amounts of rice and milk are poured into solute cups.
Figure 3F:
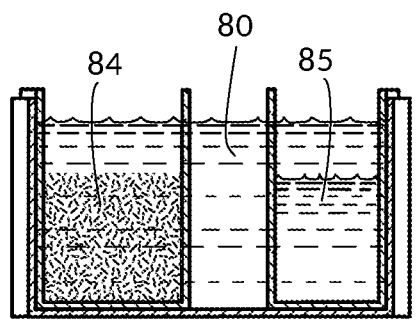
FIG. 3F illustrates the second step following FIG. 3E, where too much water is added to the solvent container, as compared to levels of rice and milk.
Figure 3G:
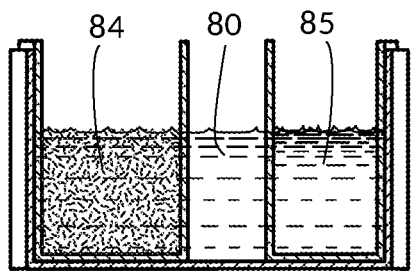
FIG. 3G illustrates the third step following FIG. 3F, where levels of rice, milk and water align.
Figure 3H:
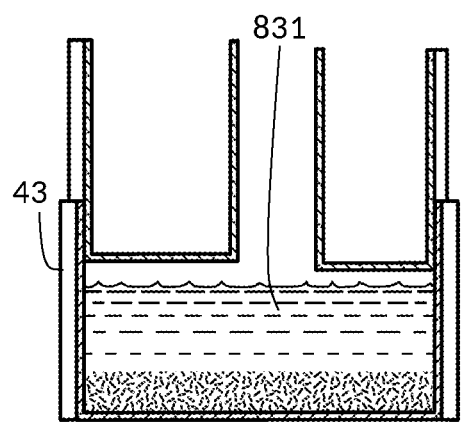
FIG. 3H illustrates the fourth step following FIG. 3G, where rice, milk and water are mixed in a 3:5 rice-to-water ratio, and in a 2:5 milk-to-water ratio.

FIG. 3E, FIG. 3F, FIG. 3G and FIG. 3H illustrate a first operation of universal mixture maker 130. In this first scenario, a chef wishes to measure a portion of long grain white rice in a 3:5 ratio to water, as well as a portion of milk in a 2:5 ratio to water. This is equivalent to measuring a 30 vol % rice and 20 vol % milk with respect to the total solution volume of 10 units (3+2+5). Solute cup models 231 and 232 from FIG. 3C and FIG. 3D are used in this first operation. In this scenario, the chef first engages cup model 231 and cup model 232 onto container 43, as shown in FIG. 3E. These two cups are placed with their bottom portions resting on the bottom portion of container 43. The chef places a desired amount of rice 84 in cup model 231. Then the chef places an amount of milk 85 matching the same level, in cup model 232. Some water 80 is poured into container 43. There isn't enough water 80 initially, as shown in FIG. 3E. The chef then pours in too much water, shown in FIG. 3F, such that the level of water 80 exceeds that of rice 84 and that of milk 85. Some water is scooped out, such that water 80, rice 84 and milk 85 have the same level, as shown in FIG. 3G. When all three ingredients are mixed in container 43, as shown in FIG. 3H, the mixture 831 is created, containing 30 vol % rice and 20 vol % milk. Mixture 831 is not a solution, as rice does not dissolve in water, and milk is a suspension.

It is noted that mixture 831 in FIG. 3H will have a slightly lower level compared to the apparent level of water 80 in FIG. 3G. This is due to water filling voids between rice granules, as described earlier. The chef has taken the size of rice granules, and the void between granules into account, when specifying a 30 vol % ratio. When two solute cups are submerged at the same time, as shown in FIG. 3E, there will be a small measurement error caused by the double counting of water displacement by sidewalls of both cups. Each solute cup can only be designed to take into account its own sidewall water displacement, with respect to the total volume of container 43. A solute cup cannot anticipate whether other cups will be used together with it in the same container. But this small measurement error is acceptable in most scenarios.

Figure 3J:
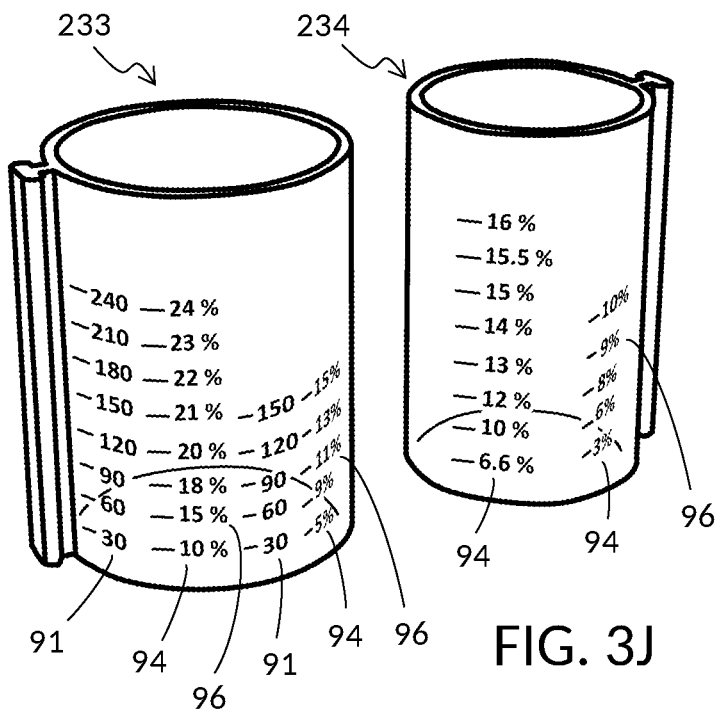
FIG. 3J is a perspective view of solute cup model 233 and solute cup model 234 of the third embodiment which are capable of measuring solutes for variable output concentration levels using multiple calibrated indicia columns. Cup model 233 measures generic concentrations from 2 vol % to 30 vol %, and cup model 234 from 1 vol % to 20 vol %.

FIG. 3J illustrates solute cup model 233 and solute cup model 234, to be used with container 43. These two cup models 233 and 234 have the same shapes and volumes as cup model 231 and cup model 232 from FIG. 3A, respectively. But in FIG. 3J, cup models 233 and 234 have calibrated indicia columns 94 displayed on their sidewalls. These calibrated indicia columns are similar to those in cup model 224 shown in FIG. 2T, and function in the same manner. That is to say, these two cup models are able to measure variable concentrations. Using calibrated markings 96 from all indicia columns some of which are not visible in FIG. 3J, cup model 233 can measure concentrations from 2 vol % to 30 vol %, and cup model 234 from 1 vol % to 20 vol %. In addition, cup model 233 is shown in FIG. 3J to have volumetric indicia 91 with solute markings.

Figure 3K:
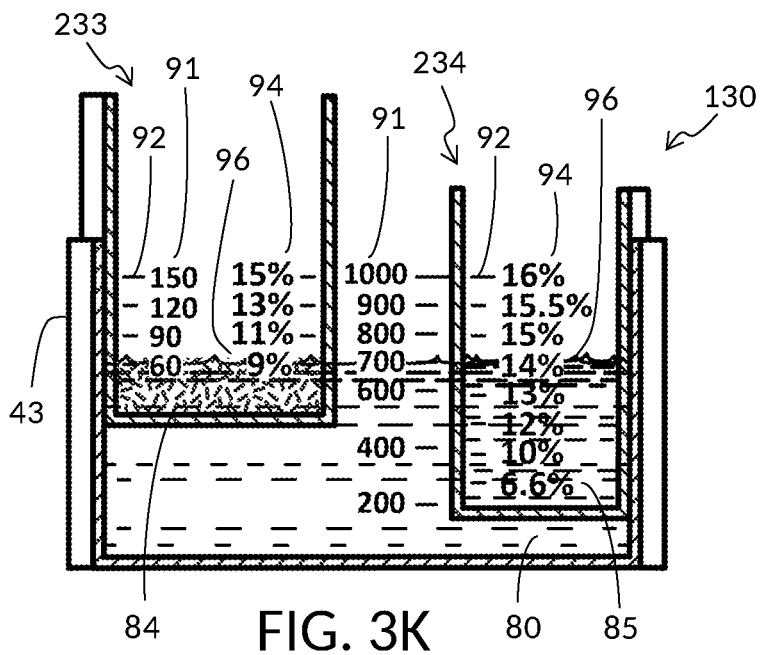
FIG. 3K illustrates a second operation of mixture maker 130 using solute cup models 233 and 234 from FIG. 3J, to find concentration levels of rice and milk from a cup of rice, a bowl of milk, and a big glass jar of water.

FIG. 3K illustrates a second operation of universal mixture maker 130. In this second scenario, a chef has been making rice pudding using a cup of rice, a bowl of milk, and a big glass jar of water. Now the chef would like to find out the concentration ratio of rice and milk, such that he can share this recipe with his friends. To do so, the chef simply pours one cup of rice 84 into cup model 233, one bowl of milk 85 into cup model 234, and one big glass jar of water 80 into container 43. The chef then adjusts the two cups such that surface levels of all three ingredients line up. In FIG. 3K, the solvent container 43 is shown to have volumetric indicia 91, using which the chef can find out the total volume of the mixture which is 700 mL. The chef identifies, for each solute cup, an indicia column where max fill line 92 aligns with the "1000" (mL) label of the volumetric indicia 91 of container 43. Using calibrated markings 96 from these indicia columns, the chef can now read proper concentration levels. Cup model 233 shows via its volumetric indicia 91 that there is 60 (mL) of rice, and the corresponding marking in the identified indicia column 94 shows this as 9 vol % of the total mixture volume of 700 mL. Cup model 234 identifies the milk content as representing a 14 vol % of the total mixture volume of 700 mL. If the two cups are lifted out of water 80, then the same volumetric indicia will show 540 mL water solvent in container 43. Now that ratios of rice and milk are identified, the same universal mixture maker 130 can be used to make mixtures of the same rice and milk concentrations, at different total mixture volumes in the future.

The second scenario in FIG. 3J and FIG. 3K highlights yet again the unique ability of a universal mixture maker to handle multiple solutes at the same time, and to mechanically solve for multiple variables in mixture equations. In the second scenario, solute volumes and solvent volume are assigned known values, and concentration levels of both solutes are mechanically found.

Fourth Embodiment

The fourth embodiment of the present disclosure and its various operations are already discussed in the Brief Summary section. I will not repeat purposes and operations covered in the Brief Summary section verbatim again here, but will instead focus on identifying parts, and on contrasting the fourth embodiment against the previous three embodiments.

Figure 4A:
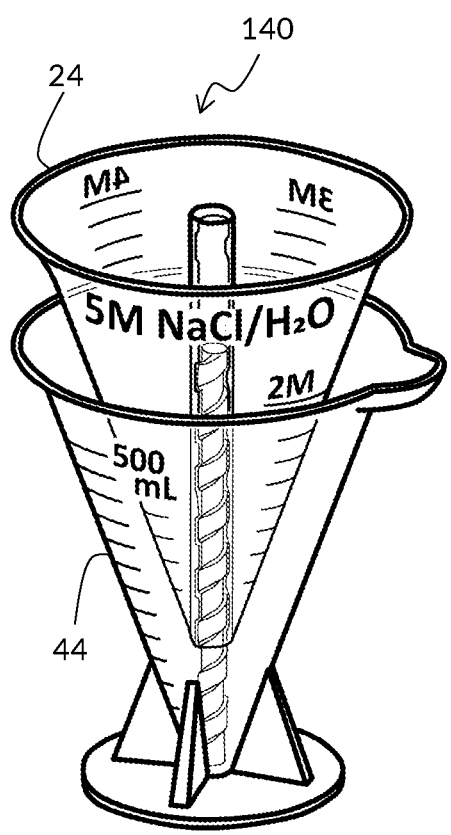
FIG. 4A is a perspective view of the fourth embodiment of the present disclosure, showing a universal mixture maker 140 with a conical solute cup, a conical solvent container, and corresponding threaded tube and rod capable of fastening said cup to said container.

FIG. 4A illustrates the fourth embodiment of the present disclosure, a universal mixture maker 140. The mixture maker is primarily a volumetric instrument. The instrument comprises a conical solute cup 24 for holding a solute, and a conical solvent container 44 for holding a solvent. As illustrated, solute cup 24 can be engaged to and lowered into solvent container 44.

Figure 4B:
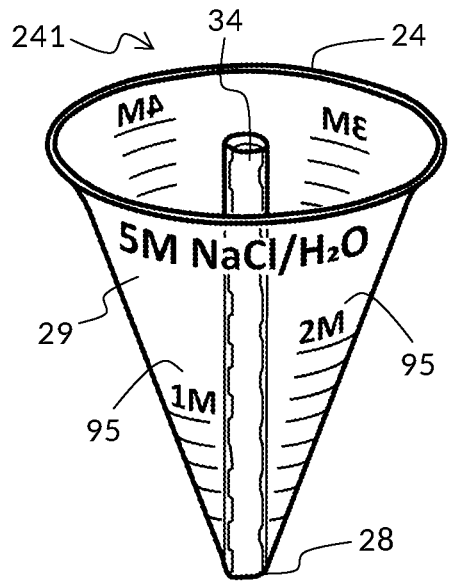
FIG. 4B is a perspective view of a conical solute cup model 241 of the fourth embodiment, for making saline dilutions of various concentration levels expressed in molar M, from a 5M NaCl stock.

FIG. 4B illustrates a solute cup model 241 comprising a solute cup 24 with curved and transparent sidewalls 29 forming an inverted cone, with a broad rim at the top, and a small portion at the base. Such conical measuring cups enable accurate measurements of a solute in large quantities as well as in small quantities. Conical measuring cups solve a measurement issue with straight containers where very small quantities of a solute are hard to measure accurately by visual inspection of surface levels. In an inverted conical measuring cup, adding a small drop of a solute to a small quantity of same solute in the cup results in a visible level rise, allowing an operator to gauge solute volumes with tiny adjustments. The bottom portion 28 of cup 24 is generally acute. A hollowed and threaded tube 34 projects upward from the bottom portion 28. The hollowed and threaded tube 34 carves out a majority of surface area of bottom port 28, leaving effectively a pinhead-sized bottom portion. Such a pinhead-size bottom portion eliminates measurement errors caused by bottom portion's displacement of water, when a solute cup is submerged in a solvent container. As already mentioned, very small quantities of solutes may be used in solute cup model 241, without an operator having to worry about measurement errors, unlike with some other embodiments. Because of both of these reasons, cup model 241 does not need a minimum fill line. The hollowed and threaded tube 34 serves as a retaining member of solute cup 24, as will shortly be discussed. Lastly, cup model 241 provides various calibrated indicia columns 95 capable of measuring aqueous NaCl solutions at variable molarities (M) from a concentrated 5M stock.

Figure 4C:
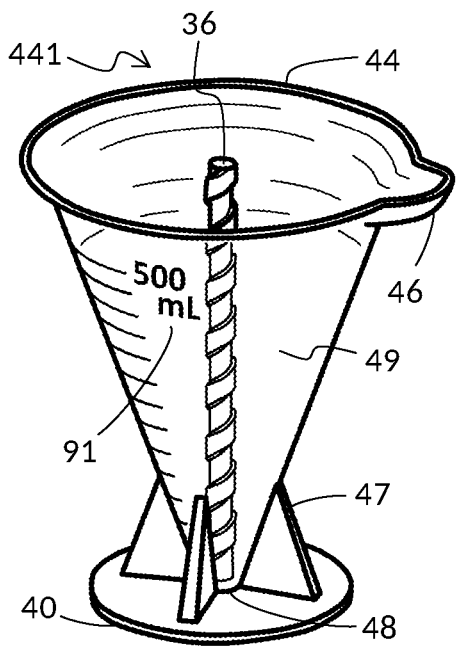
FIG. 4C is a perspective view of a conical solvent container of the fourth embodiment, with a threaded rod which is capable of receiving and subsequently retaining the threaded tube from a solute cup from FIG. 4B.

FIG. 4C illustrates a solvent container model 441 which comprises a solvent container 44 with curved and transparent sidewalls 49 forming an inverted cone. A threaded pole 36 projects upward from bottom portion 48. The inverted cone and the projection from its bottom portion are common features shared by both solvent container 44 in FIG. 4C and solute cup 24 in FIG. 4B. As a result, container 44 shares similar advantages in reducing measurement errors as cup 24. Namely, it can accurately measure both small quantities and large quantities of solvents. However, the projection 36 in container 44 is a male thread, and the hollowed tube 34 in cup 24 is a female thread. Hollowed tube 34 is designed to receive projection 36 with a friction that is small enough to allow cup 24 to be turned by its rim to be threaded and lowered into container 44. When an operator stops the threading action, cup 24 will stay at the adjusted height, and remain fastened, due to the designed amount of friction. Container 44 is provided with a flaring spout 46. This spout is not only used to pour solvents out of the container, but also used as an inlet to add solvents into the container, when a solute cup 24 is threaded and lowered almost completely into container 44, leaving very tight spaces between the rim of the cup and the rim of the container. Container 44 is provided with volumetric indicia 91. Container 44 is supported by a base 40 such that the whole container unit can stand firmly on a level ground. The acute bottom portion 48 is connected to base 40, and is structurally reinforced by four fins 47 to increase the stability of the container. These four fins 47 are design such that their obstruction of visual reading of the surface level of a solvent in the container is minimized.

Hollowed tube 34 and threaded projection 36 as shown in FIG. 4B and FIG. 4C adopt a relatively large thread pitch. This large thread pitch allows quick lowering and raising of cup 24 when engaged to container 44. That is, only eight turns of cup 24 are needed to move it vertically throughout the height of projection 36. A design with a smaller pitch would require more turns to traverse the same height, but will provide finer height adjustments. A smaller pitch would also allow cup 24 to stay fastened at any adjusted position even without explicit use of grippy materials to provide friction. With a large thread pitch and without using grippy materials, hollowed tube 34 may slip and initiate self-rotation causing cup 24 to drop in height spontaneously. One way to provide a fastening mechanism without using grippy materials is to cut notches into the bottom-facing surface of the spiral thread of projection 36, and add tiny protrusions to the top-facing surface of the spiral thread of hollowed tube 34. When cup 24 is submerged in a liquid in container 44, buoyancy will push cup 24 upward, engaging protrusions with notches, thus fastening cup 24 in place. To turn cup 24, an operator pushes cup 24 down a tiny amount, to move protrusions off notches, as if turning a child-proof cap of a pill bottle. Another way to provide a fastening mechanism is to cut notches into the top-facing surface of the spiral thread of projection 36, and add tiny protrusions to the bottom-facing surface of the spiral thread of hollowed tube 34. When hollowed tube 34 sits on projection 36 based on normal gravity, protrusions fit into notches, fastening cup 24 immobile. To turn cup 24, an operator has to lift cup 24 up a tiny amount, to lift protrusions off notches, as if turning a child-proof cap of a pill bottle with an inverse protection mechanism.

Figure 4D:
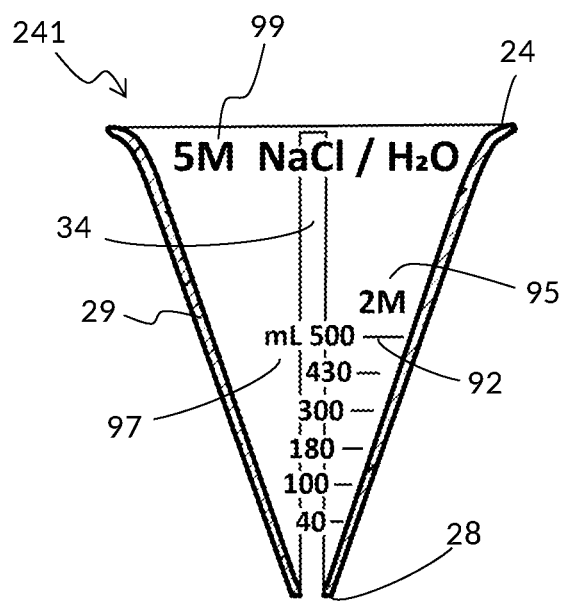
FIG. 4D is a cross-sectional view of solute cup model 241 from FIG. 4B, showing one calibrated indicia column for measuring a 2M NaCl dilution.

FIG. 4D is a cross-sectional view of solute cup model 241 showing solute cup 24 with its conical sidewalls 29 which end at an acute bottom portion 28. Main label 99 identifies the purpose of cup model 241, which is to measure a 5M concentrated NaCl stock as input solute with $H_2O$ as a solvent. Hollowed and threaded tube 34 is visible behind a calibrated indicia column 95 which shows 2M (molarity) as its target output concentration level, and a plurality of output mixture markings 97 indicating matching mixture volumes. Calibrated indicia columns 95 in solute cup model 241 of this fourth embodiment have a different design from previously discussed calibrated indicia columns 94 in the second embodiment and in the third embodiment such as shown in FIG. 2W and FIG. 3J. Whereas previous embodiments have calibrated markings 96 showing matching concentration percentage values, in this cup model 241, output mixture markings 97 show mixture volumes that an operator should align a solute cup to, as will shortly be explained. In addition, the top calibrated marking 96 of each calibrated indicia column 95 serves as max fill line 92 for a solute, given a desired output concentration level which is 2M in this view.

Figure 4E:
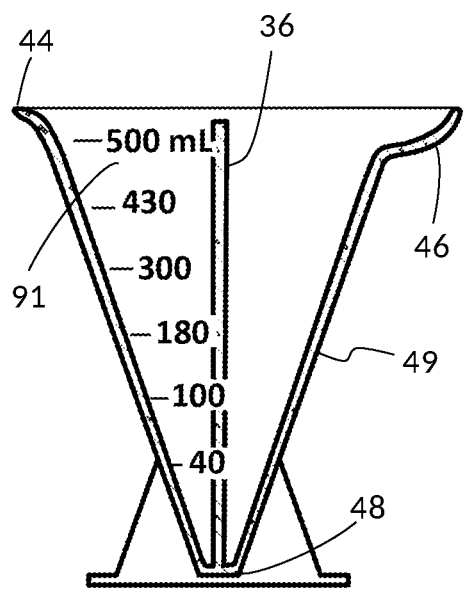
FIG. 4E is a cross-sectional view of solvent container from FIG. 4C, showing volumetric indicia with mixture markings.

FIG. 4E is a cross-sectional view of solvent container 44, showing its flaring spout 46 at the top, and its conical sidewalls 49 ending at a relatively acute bottom portion 48. Threaded projection 36 is visible behind volumetric indicia 91 which shows 500 mL as the max fill line for container 44, indicating the maximum capacity of the container.

Comparing container 44 in FIG. 4E to cup 24 in FIG. 4D, it can be appreciated that both vessels have a similar shape and volume. Bottom portion 48 of container 44 is acute but not pinhead-sized. It has enough internal floor space to accommodate the outer dimension of the bottom portion 28 of cup 24. In fact, cup 24 can be threaded and lowered completely into container 44, leaving almost no space between the two vessels to hold a solvent in container 44. This allows the fourth embodiment of the universal mixture maker to provide solute cups that can measure solutions with a near 100 vol % concentration level, while some other embodiments cannot. When measuring for very high concentration levels, flaring spout 46 becomes essential as an inlet, allowing solvents to be injected into container 44. The threaded projection 36 is almost as tall as container 44 itself. Similarly, hollowed tube 34 is almost as tall as cup 24. These long lengths allow cup 24 to be fastened to container 44 at a variety of submersion levels including completely above a solvent's surface level. This allows the fourth embodiment to measure solutions with a near 0 vol % concentration level. The 0-to-100 vol % range of the solute cup model 241 coupled with the unique design of calibrated indicia columns 95 enable a single solute cup 24 to be used to measure any desired dilution from near 0M to 5M, given an input 5M NaCl stock. Finally, sidewalls 29 of solute cup 24 are in general thin but strong enough to hold a solute. Sidewalls 29 are as thin as possible, to minimize water displacement, and to increase visibility of solutes within when observed by an operator from the outside. Sidewalls 49 of container 44 are not submerged and therefore cause no water displacement concerns. However, sidewalls 49 are still made thin enough to aid with the observation of solvent levels.

Figure 4F:
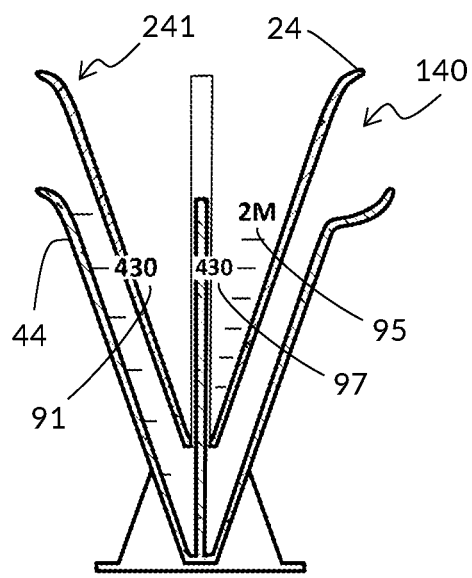
FIG. 4F illustrates the first step of a first operation of mixture maker 140, using solute cup model 241 from FIG. 4B to create a diluted NaCl solution of 430 mL volume and 2M (molarity) concentration, from a 5M NaCl stock. In this step, the solute cup is lowered into the solvent container at a level where the 430 mL output mixture marking on the cup lines up with the 430 mL mixture marking on the container. The cup is fastened to the container via the threaded tube and the threaded rod.
Figure 4G:
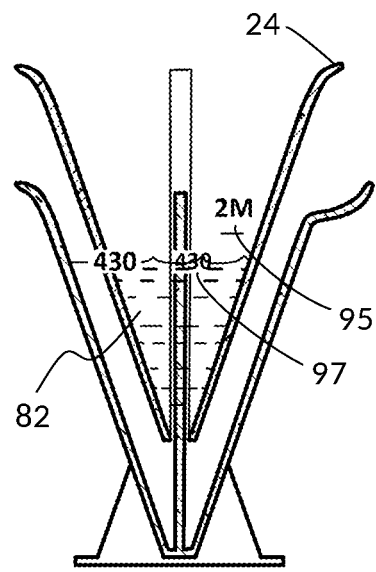
FIG. 4G illustrates the second step following FIG. 4F, where 5M NaCl stock fills the solute cup up to the 430 mL output mixture marking.
Figure 4H:
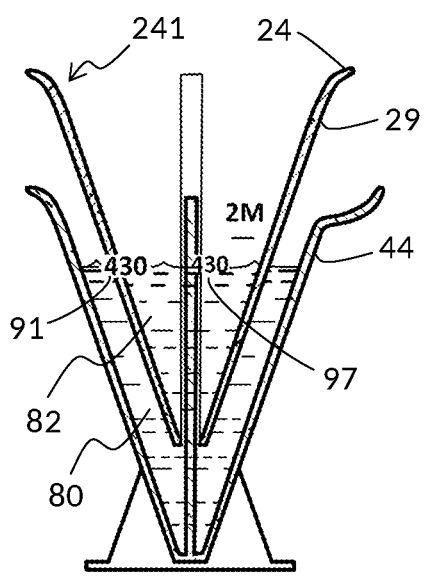
FIG. 4H illustrates the third step following FIG. 4G, where water is poured into the solvent container up to the 430 mL mixture marking.
Figure 4J:
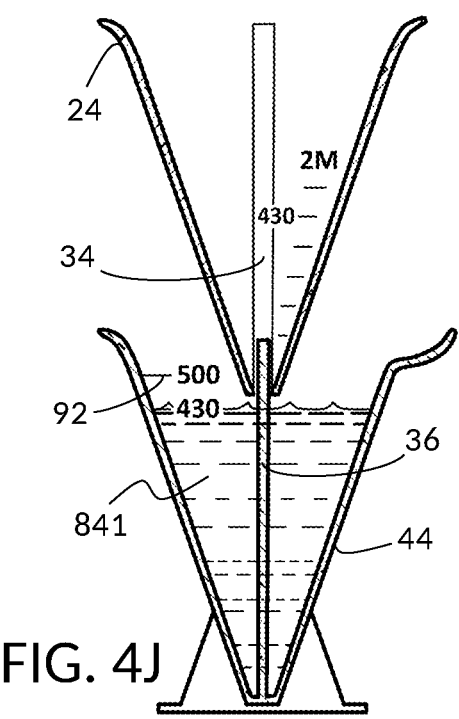
FIG. 4J illustrates the fourth step following FIG. 4H, where measured 5M NaCl stock is mixed with measured water to produce a diluted NaCl solution of 430 mL volume and 2M concentration.

FIG. 4F, FIG. 4G, FIG. 4H and FIG. 2J illustrate a first operation of universal mixture maker 140. In this first scenario, an operator wishes to create a diluted NaCl solution of 430 mL volume and 2M (molarity) concentration. A standard 5M stock is used as input solute. The operator threads cup model 241 onto container 44 as shown in FIG. 4F. The operator identifies the calibrated indicia column with a "2M" as its target output concentration level. In this first scenario, the variable for the solution amount of mixture equations is assigned a known value of 430 mL. Thus the operator identified the output mixture marking 97 of calibrated indicia column 95 on cup 24 that shows a "430" (mL) value. The operator adjusts cup 24 such that this output mixture marking 97 approximately lines up with the mixture marking of volumetric indicia 91 of container 44 with a "430" (mL) value. As shown in FIG. 4G, the operator fills cup 24 with 5M NaCl stock solute 82 up to the previously identified "430" (mL) output mixture marking 97 of calibrated indicia column 95. As shown in FIG. 4H, the operator fills container 44 with water solvent 80 up to the previously identified "430" (mL) mixture marking of volumetric indicia 91. The operator visually examines levels of water 80 and solute 82 against each other to ensure that they align with themselves, with identified "430" output mixture marking 97 on cup 24, and with "430" mixture marking on container 44. If necessary, cup 24 is adjusted, water 80 is added or removed, and solute 82 is added or removed. Finally, as shown in FIG. 4J, the measured amount of solute 82 is poured into container 44 to produce an output solution 841 of 430 mL volume and 2M NaCl concentration. Note that cup 24 in FIG. 4J is moved completely out of solution 841 in container 44, above the 430 mL mixture marking, and yet cup 24 is still well-fastened via hollowed tube 34 and threaded rod 36. In fact, cup 24 may be moved even higher, clearing the max fill line 92.

As discussed in operations of the second embodiment, an output solution such as solution 841 in FIG. 4J will often have an actual volume post mixing slightly smaller than the target 430 mL, due to partial molar property and displacement of water by sidewalls. As discussed, the pinhead-sized bottom portion of cup 24 in FIG. 4H of this fourth embodiment eliminates water displacement issues caused by the bottom portion. However, sidewalls 29 of conical cup 24 still displaces water 80, when cup 24 is submerged in water 80. As discussed for the second embodiment, sidewall water displacement and partial molar property of a NaCl solution are accounted for in the design of solute cups, in this case solute cup model 241. Universal mixture makers prioritize accurate measurement of the amount of solute 82 in cup 24, and the corresponding amount of solvent 80 in container 44, given the volume of sidewalls 29 under water 80 at current alignment of liquids at mixture marking of "430" (mL), and partial molar property of a NaCl solution at 2M given a 5M input solute. The design can be field-calibrated pre-fabrication, such that the instrument can generate an accurate concentration level in output solution 841 shown in FIG. 4J for all submersion levels of cup 24, regardless of actual resulting solution volume. As mentioned in the second embodiment, an operator can overcome the issue of reduced output volume by aiming for a slightly higher output volume such as 440 mL throughout the abovementioned process. It is easier to discard output solution produced beyond 430 mL, than to fix solute concentrations in an output solution post mixing.

Figure 4K:
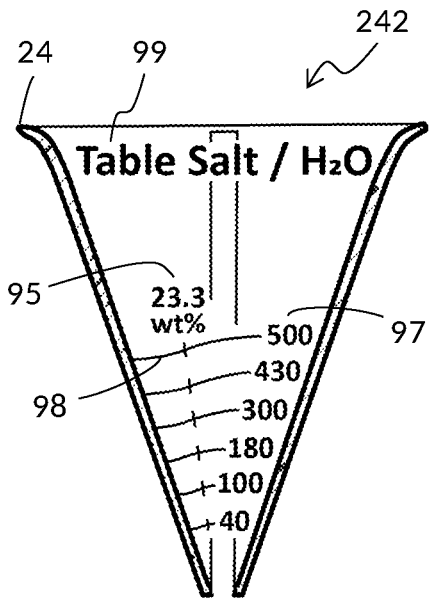
FIG. 4K is a cross-sectional view of a conical solute cup model 242 of the fourth embodiment, for making saline dilutions of variable concentration levels in wt % from table salt granules. This solute cup model can be used in a second operation of the fourth embodiment to measure solid granules.
Figure 4L:
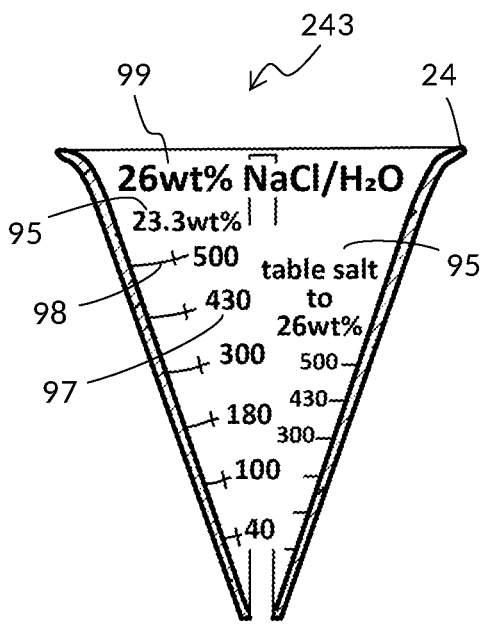
FIG. 4L is a cross-sectional view of a conical solute cup model 243 of the fourth embodiment, for making 1) saline dilutions of variable concentration levels in wt % from a saturated 26 wt % stock, and 2) said saturated 26 wt % solution from table salt granules. This solute cup model can be used in a second operation of the fourth embodiment to measure solid granules.
Figure 4M:
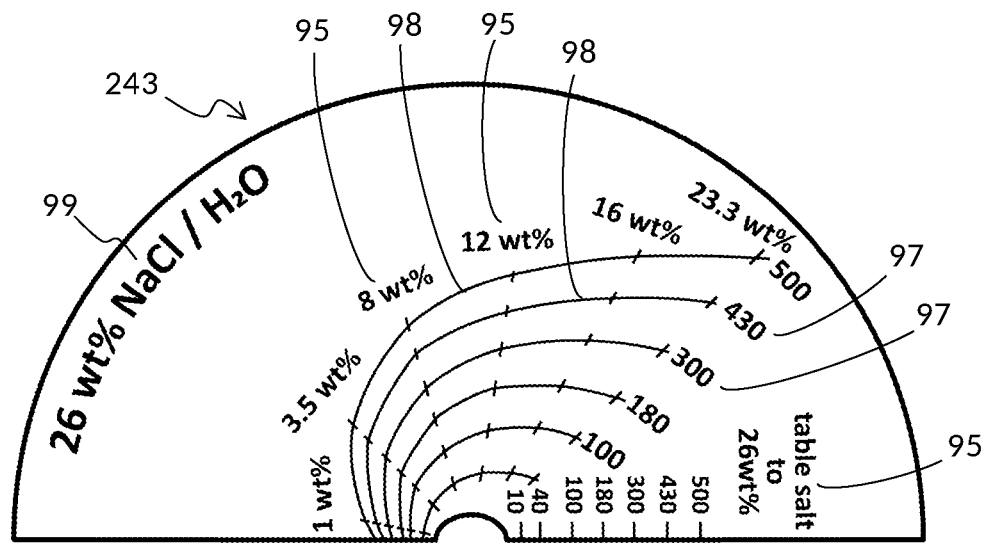
FIG. 4M illustrates an unfolded view of the outer surface of solute cup model 243 from FIG. 4L, showing a Euclidean space defined by a polar coordinate system with a pair of 1) output concentration level, and 2) output mixture volume.

FIG. 4K, FIG. 4L and FIG. 4M illustrate a second operation of universal mixture maker 140, for measuring amounts of solid granules needed for a solution with a particular output concentration level.

FIG. 4K is a cross-sectional view of solute cup model 242 with a main label 99 that identifies its purpose which is to measure solid granules of common table salt with cubic crystals of approximately 0.33 mm width and 1 g-to-0.87 mL bulk density, for dissolution in $H_2O$ as a solvent. Solute cup 24 measures said table salt for output concentration levels specified on a mass-to-mass basis (wt %) which is commonly used outside of labs. A calibrated indicia column 95 is visible with 23.3 wt % as its target output concentration level. In cup model 242, output mixture markings 97 have numeric labels placed on the far right, with continuous and curved lines 98 connecting these numeric labels to corresponding intersection points in calibrated indicia columns 95. These curved lines 98 allow an operator to interpolate points in a Euclidean space where output concentration level is represented by the x-axis, and output mixture volume is represented by the y-axis. A single solute cup model 242 is thus capable of measuring table salts for many uses, from a very small volume and a very low concentration level, to maximum container capacity of 500 mL and near saturation level of NaCl.

FIG. 4L is a cross-sectional view of solute cup model 243 with a primary purpose of measuring a saturated 26 wt % NaCl stock as input solute, as identified by its main label 99. Solute cup 24 provides calibrated indicia columns 95 with output concentration levels specified in wt % which are connected by continuous and curved lines 98, ending with output mixture markings 97 with numeric labels, similar to the solute cup model 242 in FIG. 4K. However, cup model 243 in FIG. 4L provides an additional calibrated indicia column 95 for taking common table salt crystals to produce a saturated 26 wt % stock. This unique indicia column can convert NaCl crystals that are hard to measure accurately by volume, into a saturated stock that can then be used as an input solute for precision solution making. Thus table salt can be accurately measured in two separate steps, as already described in the summary section.

FIG. 4M illustrates an unfolded view of the outer surface of solute cup model 243. It shows a fan-shaped 2D surface corresponding to the conical 3D volume of cup model 243. The main label 99 identified the primary purpose of the solute cup. Multiple calibrated indicia columns 95 can be seen, from very low concentration of 1 wt %, to 3.5 wt % seawater concentration, all the way to 23.3 wt % which is close to saturation. Continuous and curved lines 98 connect intersection points in these indicia columns together, terminating in output mixture markings 97 with numeric labels. The area covered by these curved lines 98 represent the aforementioned Euclidean space. An operator can mentally locate a desired polar coordinate of a pair 1) output concentration level and 2) output mixture volume, using interpolation in this Euclidean space, even if these two desired numbers are not explicitly labeled. As discussed, cup model 243 is able to measure a solute within a substantial range of all possible polar coordinates in this Euclidean space. The smallest coordinate is 1 wt % and 10 mL, located near the lower-center of the fan. The largest coordinate is 23.3 wt % and 500 mL, located on the upper-right of the fan. This is yet another confirmation that cup model 243 can be continuously adjusted for different levels of submersion and subsequently fastened, within a large submersible range from 10 mL to 500 mL.

The special indicia column 95 that converts table salt crystals to a saturated 26 wt % stock is provided on the right end of the fan-shaped surface in FIG. 4M. The introduction of this special indicia column has ramifications far beyond common table salt. While it is labeled mainly for measuring common table salt, it can also be used to convert NaCl salts in other granule sizes and bulk density. In order to produce a saturated 26 wt % NaCl solution, there is no need to measure an exact amount of salt. An approximate amount of salt is all that is needed to start the process. More salt can be gradually added until salt crystals stops dissolving in water. At which point an operator can simply extract the dissolved solution, and discard undissolved salt. Thus, a single cup model 243 not only measures a substantial range of all possible output concentration levels and output mixture volumes, but is also capable of taking a wide variety of forms of the same solute. This process of coupling saturated solution-making with dilution measurement is applicable to a wide variety of types of solid solutes. Solutes that clump together into an odd shape and are messy to break up can instead be first dissolved in a solvent until no further dissolution takes place. Remaining lump of undissolved solute can be removed, and the saturated solution then be used as an input solute to make a dilution.

Figure 4N:
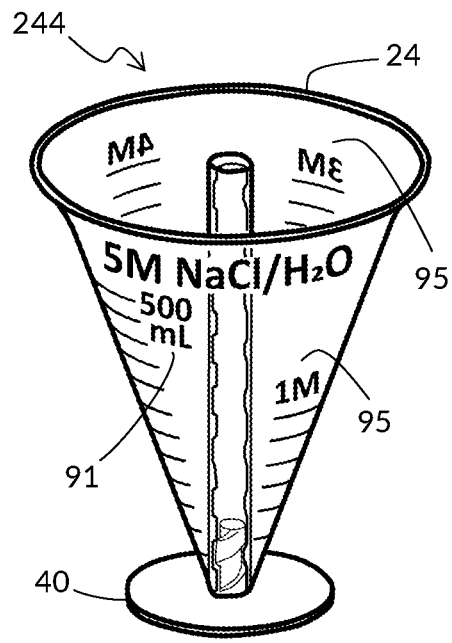
FIG. 4N is a perspective view of a conical solute cup model 244 of the fourth embodiment, for making saline dilutions of various concentration levels expressed in molar M, from a 5M NaCl stock, as well as volumetric indicia showing solute markings.
Figure 4P:
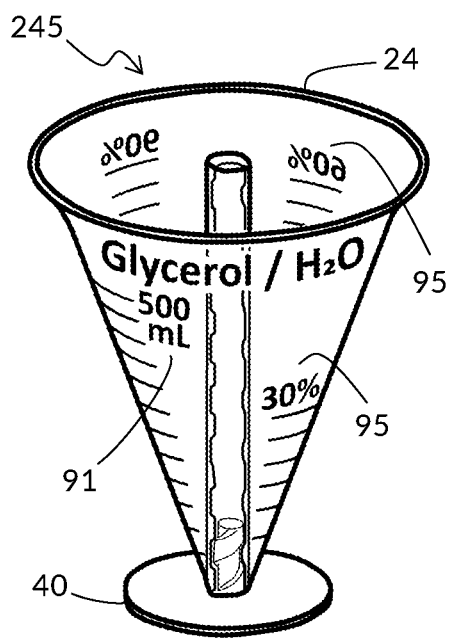
FIG. 4P is a perspective view of a conical solute cup model 245 of the fourth embodiment, for making glycerol dilutions of various concentration levels expressed in vol %, from a 100 vol % glycerol stock, as well as volumetric indicia showing solute markings.

FIG. 4N and FIG. 4P illustrate two solute cups used in a third operation of universal mixture maker 140, where an operator desires to make as much solution as possible, containing 1M NaCl and 30 vol % glycerol, using a stock 5M NaCl and a stock 100 vol % glycerol. A constraint is that there is very little 5M NaCl stock left. All of it should be used. In this particular scenario, only two solute cups are used. A solvent container is optional, as will be discussed shortly.

FIG. 4N illustrates a solute cup model 244 which is similar to solute cup model 241 in FIG. 4B. Both cup models take a 5M NaCl stock solute as input, and can measure variable output concentrations in molarity (M) via calibrated indicia columns 95. However, solute cup model 244 in FIG. 4N adds volumetric indicia 91 to solute cup 24. The indicia 91 in FIG. 4N is similar to the indicia 91 of container 44 in FIG. 4C. They both measure actual volume of a content within the respective vessel. In the case of indicia 91 in FIG. 4N, the content is 5M NaCl stock solute. Solute Cup 24 is depicted threaded into a stand with a base 40. This allows solute cup model 244 to stand on its own, when not threaded into a solvent container. In other words, solute cup model 244 can function as a standalone, generic container when needed.

FIG. 4P illustrates a solute cup model 245 that measures variable output concentration of glycerol in vol %. It takes 100 vol % glycerol as input solute. Solute cup model 245, too, is a solute cup 24 that can be threaded into a temporary stand with a base 40. Solute cup 24 is provided with volumetric indicia 91 as well as several calibrated indicia columns 95.

Figure 4Q:
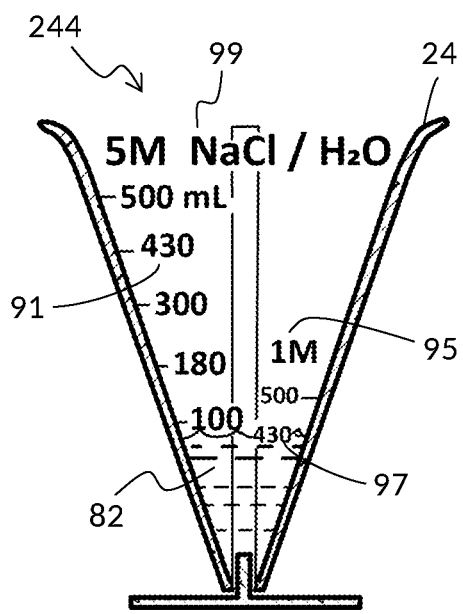
FIG. 4Q illustrates the first step of a third operation of mixture maker 140, using solute cup models 244 and 245 from FIG. 4N and FIG. 5P to make as much solution as possible, containing 1M NaCl and 30 vol % glycerol, using a stock 5M NaCl and a stock 100 vol % glycerol, where there is very little 5M NaCl stock left. In this first step, all available 5M NaCl stock is poured into solute cup model 244, measuring approximately 86 mL, and indicating a corresponding output solution volume of 430 mL.

FIG. 4Q illustrates the first step in the third operation of universal mixture maker 140. Depicted is a cross-sectional view of solute cup model 244 from FIG. 4N, with a main label 99 identifying its purpose. An operator first pours all available 5M NaCl stock solute 82 into solute cup model 244. The volumetric indicia 91 shows that there is approximately 86 mL of solute 82 in cup 24. The operator identifies the "1M" calibrated indicia column 95, and observes that an output mixture marking 97 indicates that a maximum amount of 430 mL of output solution of 1M output concentration level can be produced from said available 86 mL of solute 82. Cup model 244 is set aside temporarily.

Figure 4R:
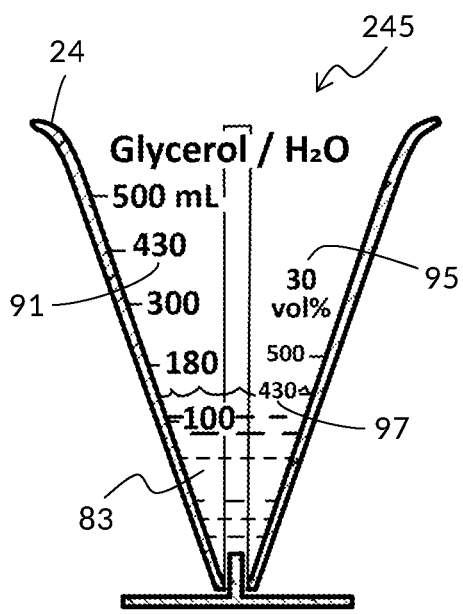
FIG. 4R illustrates the second step following FIG. 4Q, using solute cup model 245 from FIG. 4P, where the right amount of 100 vol % glycerol is poured in until it reaches the same output solution volume of 430 mL.

FIG. 4R illustrates the second step in the third operation. The operator proceeds to measure the right amount of 100 vol % glycerol solute 83 that is needed for a target output solution of 430 mL. The operator identifies the "30 vol %" calibrated indicia column 95 on solute coup model 245, and the output mixture marking 97 on it showing "430" (mL) as a target value. The operator pours 100 vol % glycerol solute 83 into cup 24 up to this output mixture marking 97. The volumetric indicia show that 130 mL solute 83 is needed to make an output solution of 30 vol % glycerol with a volume of 430 mL.

Figure 4S:
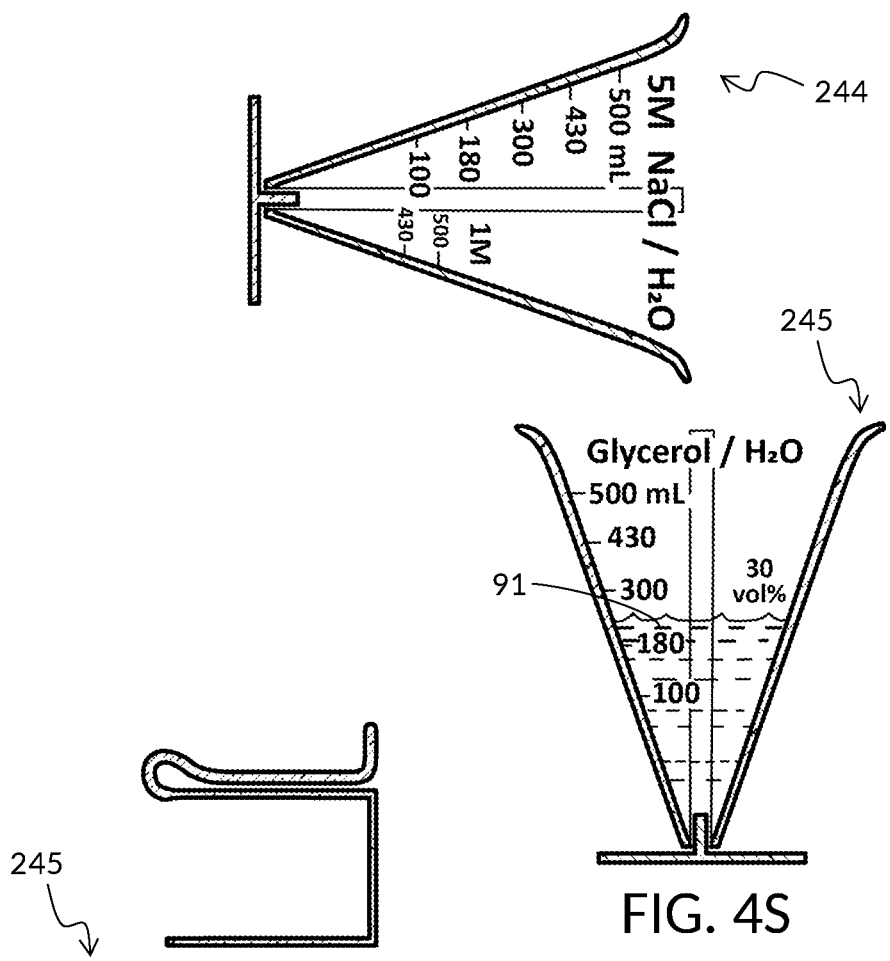
FIG. 4S illustrates the third step following FIG. 4R, where measured 1M saline dilution is poured into the glycerol solute cup.
Figure 4T:
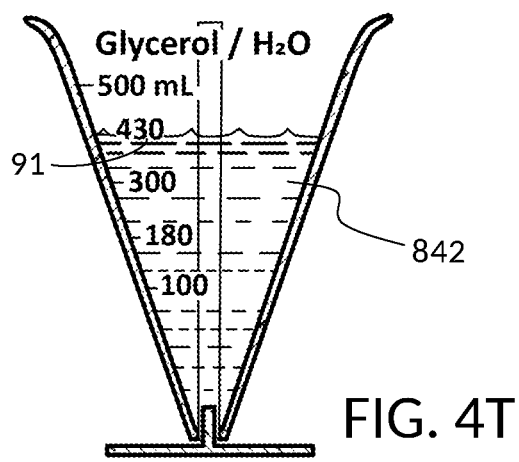
FIG. 4T illustrates the fourth step following FIG. 4S, where water is poured in up to the 430 mL mixture marking, to produce an output solution containing 1M NaCl and 30 vol % glycerol.

In FIG. 4S, the operator pours the measured 5M NaCl solute 82 from cup model 244 into cup model 245 which previously held only measured 100 vol % glycerol solute 83. The combined volume of these two solutes measures approximately 216 mL as shown in volumetric indicia 91. This is short of the target output volume of 430 mL. As shown in FIG. 4T, water is then poured into cup model 245 to bring the total volume of the solution to 430 mL, as shown in volumetric indicia 91. This produces an output solution 842 containing 1M NaCl and 30 vol % glycerol.

This third scenario is an exception where a solvent container is optional. The final addition of a proper amount of water is done in a solute cup instead of a solvent container. This is possible due to the introduction of water being the last step in mixture preparation. This scenario also allows more than two solutes to be measure. Any number of solutes may be independently measured, and then added together. However, once the first two solutes are added together, an operator is committed to making an exact configuration of a solution. When soluble ingredients are mixed, they are not easily separated. As has been shown and will be further demonstrated, the pairing of solute cups and containers allows interactive search of measurements. The pairing allows mid-process adjustments of desired quantities of solutes, solvents and solutions, without an operator having to prematurely commit to a configuration of solution.

In a fourth operation of universal mixture maker 140 using solute cup models 244 and 245 as shown in FIG. 4N and FIG. 4P, an operator does not know a priori which of the two solutes is the constraining factor in making a maximum amount of an output solution. Suppose the solvent may also be the one in short supply, so an operator does not know which ingredients can be assigned a known value at the start. In this case, a solvent container is needed, and an iterative method used. An operator will need to incrementally pour the two solutes into their respective solute cups and monitor respective output mixture markings their surface levels indicate, until a constraining solute is identified. Then the solvent water is poured into a solvent container, and the solute cup of the constraining solute lowered into it. An iterative search like described in the fifth operation below will be followed in order to determine whether the solvent or the solute is the true constraining factor.

Referencing FIG. 4C and FIG. 4P, in a fifth operation of universal mixture maker 140, an operator wishes to create a diluted glycerol solution with an output concentration level of 30 vol %, from a 100 vol % glycerol solute, with exactly 300 mL of solvent water. FIG. 4C illustrates a conical solvent container model 441 with volumetric indicia 91 showing a maximum capacity of 500 mL. FIG. 4P illustrates a conical solute cup model 245 capable of measuring variable concentrations from a 100 vol % glycerol solute.

Figure 4U:
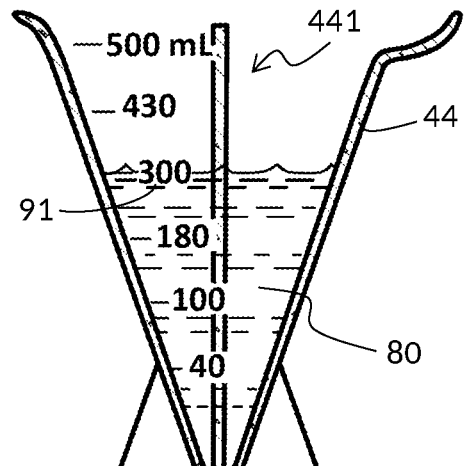
FIG. 4U illustrates the first step of a fifth operation of mixture maker 140, using solute cup model 245 from FIG. 4P to create a diluted glycerol solution with an output concentration level of 30 vol %, from a 100 vol % glycerol solute, with exactly 300 mL of solvent water. In this first step, 300 mL of water is poured into the solvent container.
Figure 4V:
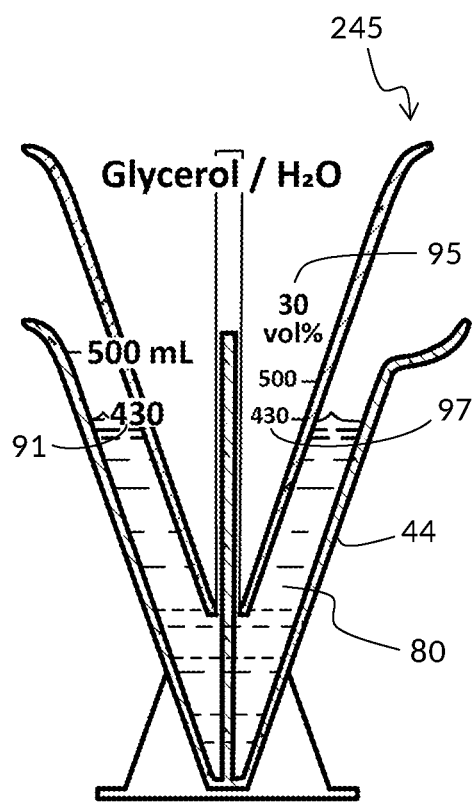
FIG. 4V illustrates the second step following FIG. 4U, where solute cup model 245 is lowered into water in the solvent container, until an output mixture marking on the cup matches a mixture marking on the container.
Figure 4W:
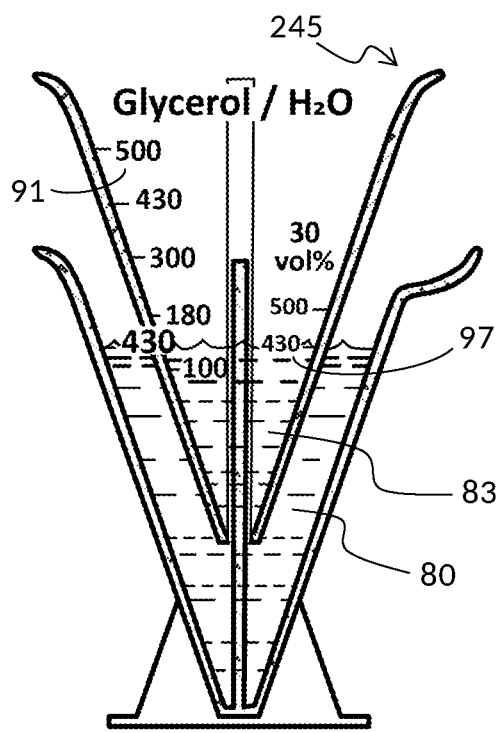
FIG. 4W illustrates the third step following FIG. 4V, where glycerol is poured into the solute cup until the level of glycerol matches that of water.

FIG. 4U illustrates the first step of the fifth operation, where an operator fills solvent container 44 of container model 441 with exactly 300 mL of water solvent 80. That is, the variable for the solvent volume in mixture equations is assigned a known value. This known value of 300 mL is shown on the mixture indicia 91 as the current water level. FIG. 4V illustrates solute cup model 245 being lowered incrementally into water 80 in container 44. The operator monitors and compares the rising level of water 80 as shown by mixture indicia 91, against the changing output mixture marking 97 of calibrated indicia column 95 with a number equal to the rising water level. When the water level aligns with said output mixture marking 97, as shown in FIG. 4V where 430 mL is indicated by an output mixture marking 97, then mixture equations have been solved mechanically. It is now known that the output solution volume will be approximately 430 mL. As shown in FIG. 4W, glycerol solute 83 is poured into cup model 245 until solute level reaches the output mixture marking 97 which indicates "430" (mL). The volumetric indicia 91 of cup model 245 should indicate approximately 130 mL as the amount of solute 83. If there isn't enough solute 83 to fill up to this level, the fifth operation can be aborted, and the steps taken in the third operation may now be followed instead, with glycerol solute 83 as the constraining factor. On the other hand, if 130 mL is available, then both solute 83 and solvent 80 are now properly measured for mixing.

As previously discussed in the summary section, the processes just described is an example of a mechanical calculator. A human operator runs an iterative method which finds a solution to a set of multivariate equations. A universal volumetric instrument reduces these variables down to one parameter for the operator to adjust: how much of the solute cup to submerge in the water solvent. The instrument reduces equations down to two markings for the operator to visually align: a volumetric marking on the container, and an output mixture marking on the cup.

Figure 4X:
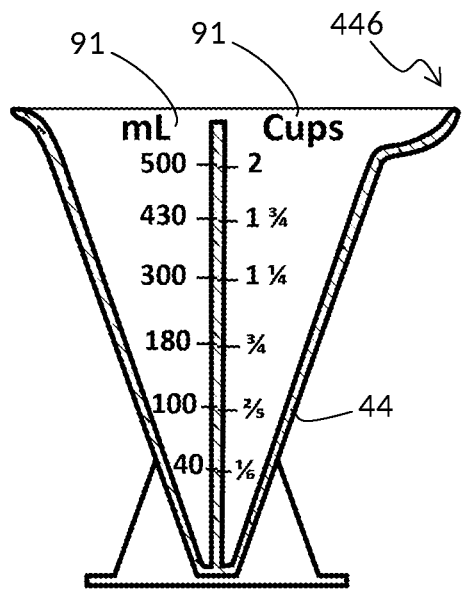
FIG. 4X is a cross-sectional view of a conical solvent container model 446 of the fourth embodiment, with markings for standard unit conversions.
Figure 4Y:
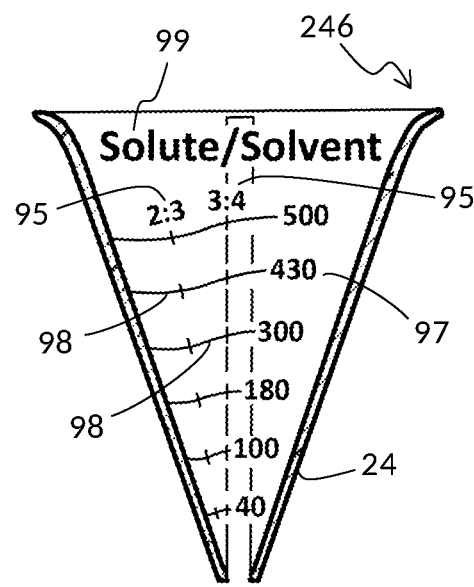
FIG. 4Y is a cross-sectional view of a conical solute cup model 246 of the fourth embodiment, to measuring generic volumetric ratios between a solute and a solvent.

FIG. 4X and FIG. 4Y illustrate a solvent container model 446 and a solute cup model 246, two additional models in the fourth embodiment of the present disclosure, a universal mixture maker 140.

FIG. 4X is a cross-sectional view of solvent container model 446. This is similar to the solvent container 44 shown in FIG. 4E. But in container model 446, multiple volumetric indicia 91 are provided, representing common units used in measuring, including mL, pint, cups, oz, tablespoon and teaspoon.

FIG. 4Y is a cross-sectional view of solute cup model 246 with a main label 99 that identifies its purpose which is to measure generic volumetric ratios between a solute and a solvent. This is different from most solute cup models presented so far, where concentration levels of solutes are expressed against a total volume of an output solution which combines solutes with a solvent. Contrast cup model 246 showing solute-to-solvent ratio in FIG. 4Y, to cup model 242 showing a solute-to-solution ratio in FIG. 4K. In cup model 246, calibrated indicia columns 95 show such solute-to-solvent ratios in a commonly used form of "solute:solvent", such as "2:3" and "3:4". Other than these differences, curved and continuous lines 98 and output mixture markings 97 are similarly provided in both cup model 246 and cup model 242.

In a sixth operation of the fourth embodiment, a chef measures long grain white rice as a solute, for use with one bowl of water as a solvent, at a 2:3 ratio as a recipe calls for. In this case, the amount of water solvent is a known value, a constraining factor. This is a scenario similar to the fifth operation illustrated in FIG. 4U, FIG. 4V and FIG. 4W. Thus similar iterative method is used to find the proper amount of rice that is needed, using calibrated indicia column 95 labeled for "2:3" ratio in FIG. 4Y. After measurement, amounts of measured water and measured rice can be converted to the most convenient units using various volumetric indicia 91 in FIG. 4X.

In a seventh operation of the fourth embodiment using solvent container model 446 and solute cup model 246 shown in FIG. 4X and FIG. 4Y, a home chef wishes to measure at least one tea cup of rice, or at least one thermal coffee mug of water, whichever produces more final mixture at the same 2:3 rice-to-water ratio. This resembles the fourth operation, as both scenarios attempt to maximize the amount of solution made. But in this seventh scenario, the chef is not constrained by availability of ingredients, but by the availability of vessels available at his kitchen. By fixing amounts of ingredients in his recipe to a common vessel around his kitchen, he can reliably reproduce his regular dishes in the future by simply remembering which vessels to use for which ingredients. So the chef takes an initial guess, and pours a tea cup of rice to into cup model 246, and a thermal coffee mug of water into container model 446, as a starting point. The chef adjusts cup 24 such that surface levels of rice and water align. Looking at calibrated indicia column 95 for 2:3, if output mixing marking 97 on cup 24 shows a greater number than volumetric marking 91 on container 44, then there is more rice than water. In this case, the chef will anoint the "tea cup" as a pivotal vessel, and then top off water to match the level of rice. The chef will then remove cup 24, and find a common vessel in his kitchen that approximately holds the same amount of measured water. If volumetric marking 91 shows a greater number, then the chef will anoint the "thermal coffee mug" as a pivotal vessel, top off rice to the same level, and find a vessel that approximately holds this amount of rice.

Figure 4Z:
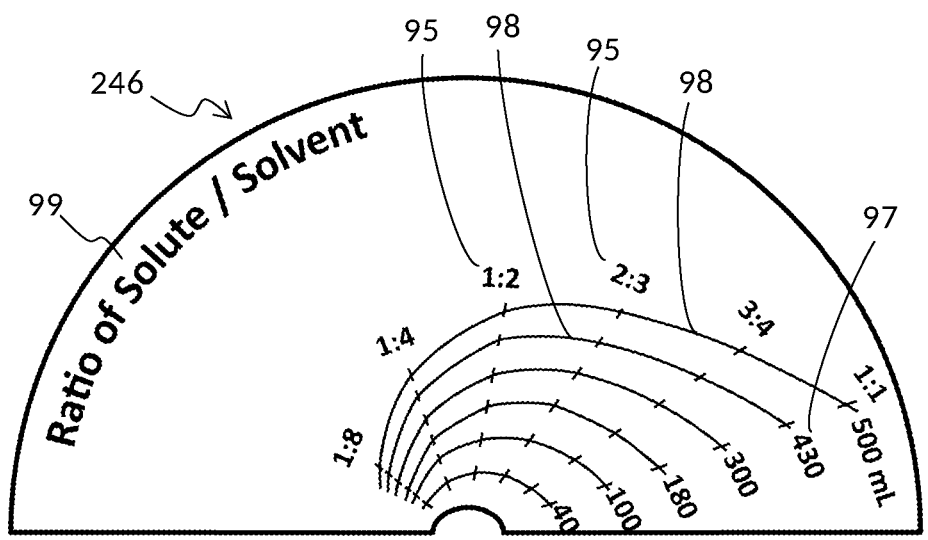
FIG. 4Z illustrates an unfolded view of the outer surface of solute cup model 246 from FIG. 4Y, showing a Euclidean space defined by a polar coordinate system with the pair of 1) output concentration ratio, and 2) output mixture volume.

FIG. 4Z illustrates an unfolded view of the outer surface of solute cup model 246. It is similar to the unfolded view of solute cup model 243 shown in FIG. 4M. The main label 99 in FIG. 4Z identifies this cup as measuring generic volumetric ratios between a solute and a solvent. Multiple calibrated indicia columns 95 indicate various commonly-used ratios, in increasing concentration from left to right. Continuous and curved lines 98 connect intersection points in indicia columns, terminating in output mixture marking 97 with numeric labels. As seen by these markings, cup model 246 is able to measure a solute within a substantial range of all possible coordinates in the Euclidean space defined by output concentration levels and output mixture volumes. It is worth mentioning that this space closely resembles a polar coordinate system, due to the conical surface of cup model 246. Furthermore, neither axis in the coordinate system have a linear numbering. This non-linear numbering is a result of several factors including the conical 3D shape of cup model 246, and the partial submersion nature of a solute cup in a solvent container. As mentioned before, actual markings, lines and numbers are determined not only by theoretical calculations, but also by empirical refinement and confirmation taking into consideration actual manufacturing details of both cups and containers.

In an eight operation of the fourth embodiment using solvent container model 446 and solute cup model 246 shown in FIG. 4X, FIG. 4Y and FIG. 4Z, a chef has perfected a dish by trial and error. He has found that a prefect rice pudding is created from exactly 1 tea cup of milk, 1 thermal coffee mug of rice, and 1 leveled spatula of brown sugar, mixed with 1 bowl of water. Now he wants to find and write down ratios of these ingredients, so this dish may be recreated at any proportion. This is almost the opposite of the seventh operation. The chef first chooses the 1 bowl of water as a common denominator, the solvent, and pours this 1 bowl of water into container 44. After pouring the first ingredient, a tea cup of milk, into cup 24, the chef submerges cup 24 in the water until surface levels of milk and water align. The chef notes that volumetric indicia 91 of container 44 indicates a total solution volume of 430 mL. This is not a number that is useful in the actual preparation of this dish. It is just a theoretical volumetric sum of the 1 bowl of water and 1 tea cup of milk. But this number allows the chef to find the ratio of a tea cup to a bowl. To find the ratio, the chef finds this same number 430 (mL) on an output mixture marking 97 of cup 24 as shown in the unfolded view in FIG. 4Z. Following the corresponding curved line 98 of 430 (mL) until this curved line intersects with the surface of milk, the chef identifies the intersecting calibrated indicia column. Following the dotted vertical line of this column upward, the chef sees "1:4" labeled as the concentration level of this column. This tells the chef that the ratio of a tea cup to a bowl is 1:4, and this is what the chef writes down. If an intersection point is not exactly marked by a vertical line and a curved line, then the chef can interpolate both output mixture volume and output concentration level. The same process is repeated for the rest of ingredients. For every ingredient, the theoretical volumetric sum will be different, and is only useful for finding the right output concentration level.

Fifth Embodiment

Figure 5A:
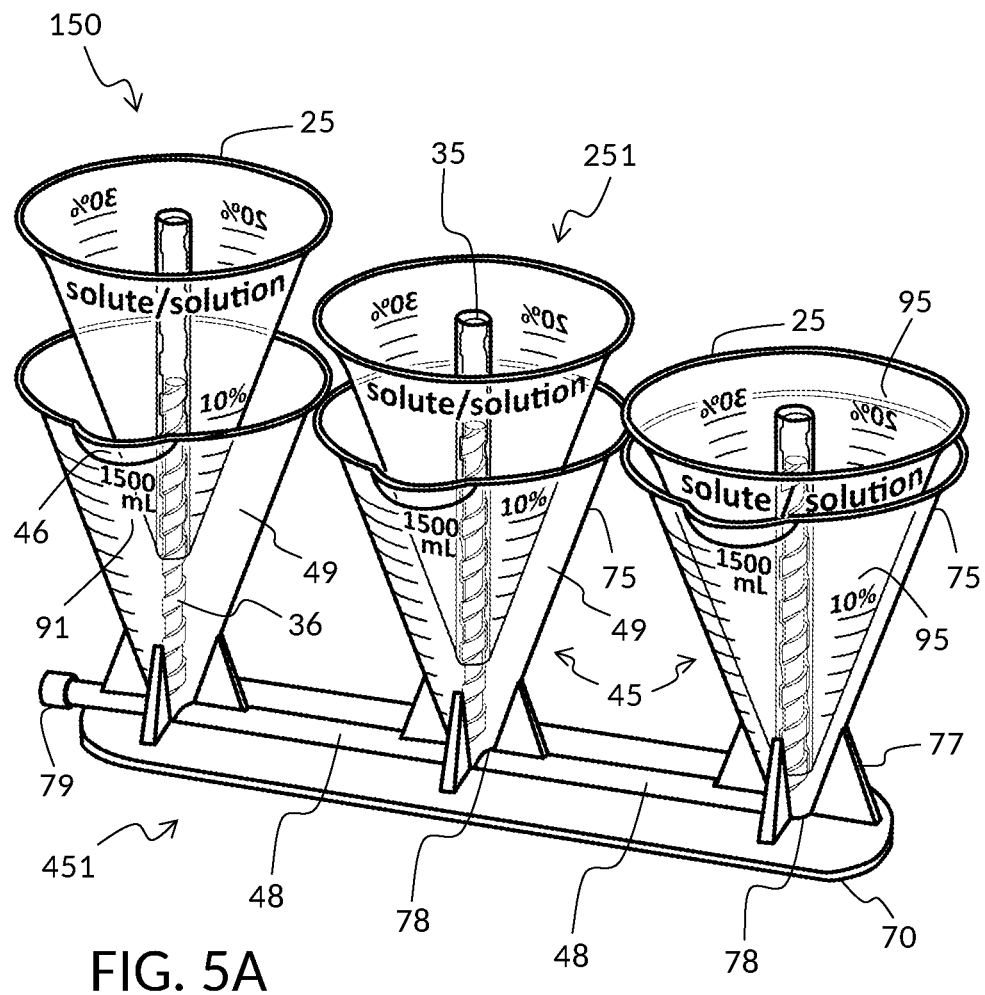
FIG. 5A is a perspective view of the fifth embodiment of the present disclosure, showing a universal mixture maker 150 comprising three solute cups that fit into three interconnected solvent chambers formed by sidewalls of the solvent container.

FIG. 5A illustrates the fifth embodiment of the present disclosure, a universal mixture maker 150. The instrument comprises three conical solute cups 25 of solute cup model 251 for holding three solutes, and a solvent container model 451 for holding a solvent in a solvent container 45 whose sidewalls 49 are formed into three interconnected solvent chambers 75.

Each of the three interconnected chambers 75 in FIG. 5A are similar to the standalone solvent container 44 from the fourth embodiment shown in FIG. 4C, and are provided each with a flaring spout 46 and a threaded pole projection 36. In the fifth embodiment, however, the bottom portion 48 of solvent container 45 comprises a pipe that connects the acute bottom portions 78 of the three solvent chambers 75. The tree solvent chambers 75 are supported by a base 70, and structurally-reinforced with fins 77. The bottom portion pipe 48 is built into base 70, and allows a solvent to freely move from one chamber to another. As a result, volumetric indicia 91 on solvent container 45 indicate the total volume of a solvent dispersed in three chambers 75. The label "1500 mL" is visible marking the maximum fill line for the entire solvent container model 451. Each solvent chamber only holds ⅓ of this capacity, that is, 500 mL. Bottom portion pipe 48 is able to discharge solvent contained within container 45 from an end which can be plugged up with plug 79 when not discharging.

Solute cup model 251 in FIG. 5A is similar to solute cup model 245 from the fourth embodiment shown in FIG. 4P. A hollowed and threaded tube 35 projects upward from the bottom portion of each solute cup 25, and is capable serving as a retaining member to receive and fasten to said threaded pole projection 36 from each of the three solvent chambers 75. In the fifth embodiment, cup model 251 comprises a solute cup 25 with corresponding calibrated indicia columns 95 designed for use with the triple-chamber container model 451. That is, markings such as output mixture markings in cup model 251 assume that a solvent in solvent container 45 is evenly distributed in all three solvent chamber 75 by bottom portion pipe 48.

Figure 5B:
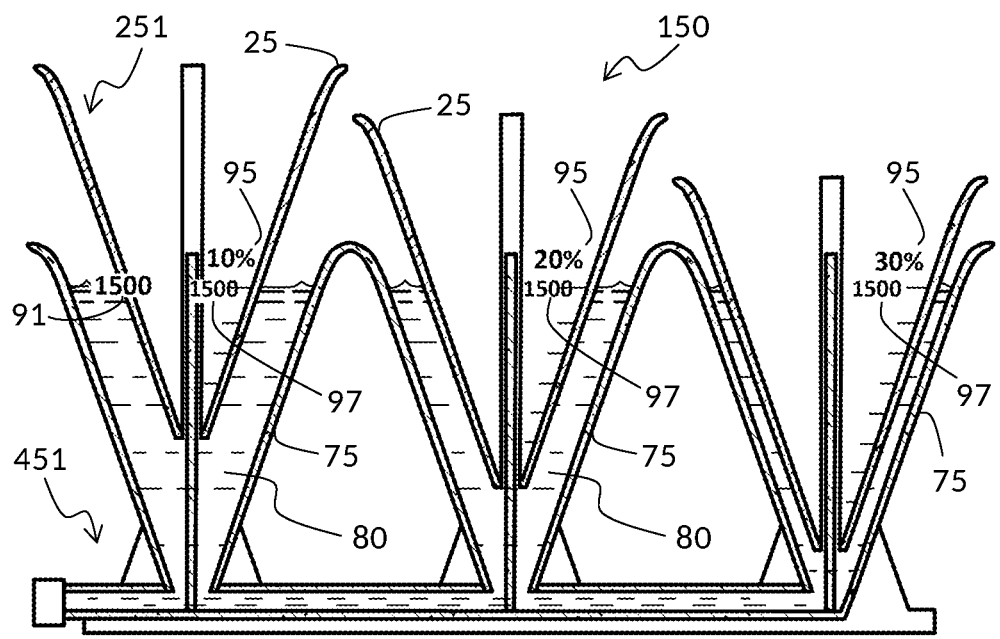
FIG. 5B illustrates the first step of an operation of mixture maker 150, using solute cup model 251 and solvent container model 451 from FIG. 5A, to make a sanitizing solution containing 10 vol % of 3% hydrogen peroxide stock, 20 vol % glycerol, and 30% isopropyl alcohol, with 600 mL of water as solvent. In this first step, 600 mL of water is added, and three solute cups lowered until a mixture volume emerges aligning a mixture marking on the container with all three chosen calibrated indicia columns on the three solute cups.
Figure 5C:
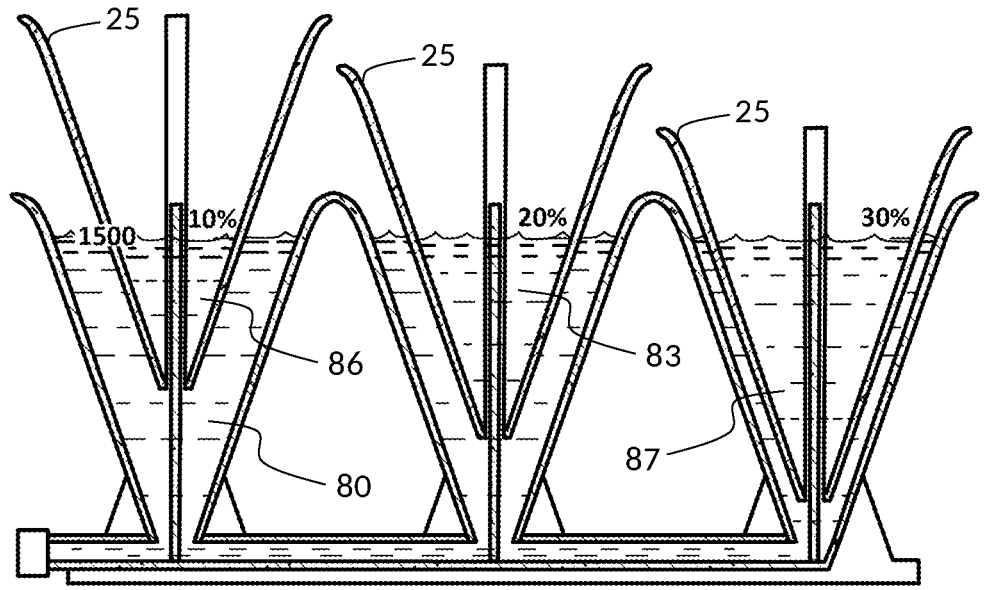
FIG. 5C illustrates the second step following FIG. 5B, where three solutes are added up to the level of the water solvent, thus producing a sanitizing solution containing 10 vol % of 3% hydrogen peroxide stock, 20 vol % glycerol, and 30% isopropyl alcohol.

FIG. 5B and FIG. 5C illustrate an operation of the fifth embodiment using three solute cups 25 of cup model 251 and a solvent container model 451. An operator wishes to use 600 mL of water as solvent to make a sanitizing solution containing 10 vol % of 3% hydrogen peroxide stock, 20 vol % glycerol, and 30% isopropyl alcohol. The operator pours 600 mL of water solvent 80 into any of the three solvent chambers 75. Then the operator lowers three solute cups 25 into the three chambers 75. The operator identifies calibrated indicia columns 95 showing 10 vol % on the left cup 25, 20 vol % on the middle cup 25, and 30 vol % on the right cup 25. The operator adjusts heights of these three cups 25, until a mixture volume emerges aligning a marking of volumetric indicia 91 with an output mixture marking 97 showing the same volume on all three calibrated indicia columns 95. For this scenario, the mixture volume thus reached interactively is 1500 mL, as shown in FIG. 5B. The operator then pours 3% hydrogen peroxide stock solute 86 into the left cup 25 to the 1500 mL mark, glycerol solute 83 into the middle cup 25 to the 1500 mL mark, and 100% isopropyl alcohol solute 87 into the right cup 25 to the 1500 mL mark. This completes the measuring of solutes. All ingredient may now be mixed into a final solution.

The above scenario shows that the universal mixture maker 150 allows an operator to interactively play with three variables in mixture equations at the same time, namely volumes of all three solutes. These three variables are changed via manual and iterative adjustments of the submersion level of each of three solute cups. The operator visually aligns container's volumetric markings against output mixture markings of the three solute cups until a solution to these multivariate equations is found. Compare this to the fifth operation of the fourth embodiment, where solvent volume is similarly assigned a known value, but only one solute volume is being iteratively found.

As noted earlier, conical solute cups reduce water displacement errors caused by bottom portions of a cup. Conical solute cups are designed to incorporate sidewall thickness and partial molar property into its measuring process, eliminating related measuring errors. However, when more than one conical cup is used in one container, such as is the case with the fifth embodiment, the design of each cup is unable to anticipate how much other cups will contribute to the total water displacement by all sidewalls. Each cup can only be designed around its own sidewall configuration. As a result, there will be a small measurement error when multiple cups are used together. However, in most scenarios, this small measurement error is acceptable.

ALTERNATIVE EMBODIMENTS

While the present disclosure is susceptible to further modifications and variations, a selection of embodiments is shown in drawings and described in the specification. It is understood that the selection does not set a limit on the disclosure. On the contrary, the intention is to cover all modifications, alternative constructions, combinations, and equivalents found within the spirit and scope of the present disclosure.

A person skilled in the art will understand that further changes can be made to embodiments described, and still achieve desired results. It is also apparent that different combination of features described in selected embodiments can produce similar advantages and benefits. In some cases, a subset of these features can still produce the same advantages and benefits, and may even be desirable in certain use cases. All of above are a part of the present disclosure.

A solute cup submerged in a container may also play the role of a solvent container, hosting a second solute cup fastened to it, Russian-doll style. There are use cases where such configurations would be useful.

Flaring spouts described in some container models are not only for pouring a liquid out of a container, but also useful for adding liquid or solid into said container. In some embodiments, a solute cup and a solvent container have similar or identical shape, such that they can be nested very close together leaving very little space between said cup and said container to hold a solvent. While this allows for measurement of very high solute concentrations, it makes adding a solvent into this tight space difficult. Flaring spout on a solvent container is one way to provide such a solvent inlet space. Furthermore, an inlet space also prevents a cup from sealing closed against a container, creating a vacuum. Alternatively, the rim of a solute cup may be warped inward, creating a notch for the same purpose. The hollowed and threaded tube of a solute cup from the fourth embodiment may open at its top end to serve as a solvent inlet. All alternative ways to create an inlet and prevent a vacuum are within the scope of the present disclosure.

Various types of retaining members have been presented in various embodiments in the present disclosure. A fastening mechanism from one embodiment may work with solute cups and solvent containers from other embodiments. For instance, C-clamps in the second embodiment used on hexahedron vessels can be used with conical vessels in the fourth embodiment, which then eliminates the need to have conical cups and containers provide hollowed tubes and threaded rods. The threaded rod and the hollowed tube of the fourth embodiment may be used with hexahedron vessels in the second embodiment. Not only can hollowed tubes project out of the center of a hexahedron vessel, these tubes may be built into one or more corners of said hexahedron vessel as well. Spiral threads of the hollowed tube and the threaded rod in the fourth embodiment may be hard to clean, when coated in solvents and solutions. The tube and the rod may instead be made as a plain tube and a plain rod with a relatively high friction serving as a fastening mechanism. And the top of the hollowed tube may provide a threaded opening through which a long, threaded bolt may be engaged. When said threaded bolt is screwed in, the cup is bumped upward. When said threaded bolt is unscrewed out, the cup may be manually pushed downwards. Other retaining and fastening mechanisms not explicitly described here which serve a similar purpose may also be used, and are all within the scope of the present disclosure.

Various types of markings on containers and cups are described in the present disclosure, including pen mark 90 in FIG. 1P, volumetric indicia 91 in FIG. 2A and FIG. 2B, max fill line 92 in FIG. 2A, minimum fill line 93 in FIG. 2A, calibrated indicia columns 94 with calibrated markings in FIG. 2P, calibrated indicia columns 95 with output mixture markings 97 in FIG. 4B, continuous and curved lines 98 in FIG. 4K, main label 99 in 4D, etc. These markings may be printed on the outside surface and the inside surface of a sidewall of a cup or a container. These markings may be made by an operator based on instructions. These markings may be provided with custom stickers that adhere to said surfaces. Cups and containers may have carved slots that receive custom inserts providing these markings. Cups and containers may be provided with only generic lines and curves, where operators customize them with manually-labeled numbers for their own needs per instructions. Other marking mechanisms not explicitly described here which serve a similar purpose may also be used, and are all within the scope of the present disclosure.

Augmented reality is a natural extension of the universal mixture maker. Some or all of markings mentioned above may be provided via augmented reality on a computing device with an augmented reality app, when cups and containers in a universal mixture maker are viewed through said augmented reality app. That is, physical cups and containers of a universal mixture maker may be devoid of any physical markings, and all of said markings can be displayed by a computing device when it detects the type, the shape, the orientation and other metrics of these vessels. The app can then display appropriate superimposed, virtual markings and labels based on an operation an operator wishes to perform. Such augmented reality apps can also instruct an operator to make physical markings on blank cups, blank containers or blank inserts based on their needs. In additional, an augmented reality app can take an input query such as "find a solute cup for measuring by wt % from an 5M NaCl stock", and prominently highlight the right solute cup among a set spread out on a desk, as an operator scans the desktop with the app. Augmented reality may even reverse the roles of solute cups and solvent containers, for scenarios where such reversals are more advantageous. For instance, when a high concentration of glycerol is called for, instead of displaying a virtual solute cup model 245 shown in FIG. 4P for glycerol, a container with a threaded rod can be virtually marked for holding a large quantity of glycerol, and a cup with a hollowed tube can be virtual marked for holding a small quantity of water. Such a role reversal yields more accurate measures for this situation. An augmented reality app may also recognize levels of solutes and solvents, and display information related to detected levels, such as volumetric measures and calculated concentration levels.

Transparency of sidewalls in cups and containers is one way to provide visual indications of surface levels of solutes and solvents contained in them. Many embodiments presented thus far show markings on transparent sidewalls, readable from outside a cup or a container. But solids and liquids may be colored and non-transparent, making it difficult to read markings on walls in front of them, and to see levels of solutes and solvents behind them. Thus, markings may also be printed on the inside surface of sidewalls in different colors. Markings may be provided in an upward-facing surface or ramp, such that they are visible when viewed from top down, and/or become hidden by opaque liquids or solids when submerged under them. Other visualization mechanisms and material types not explicitly described here which serve a similar purpose may also be used, and are all within the scope of the present disclosure.

Embodiments in the present disclosure in general show an open top on vessels. Most vessels hold their content with a bottom portion and some sidewalls. However, solute cups may be covered with a top portion, as long as there is an inlet access for adding and removing solutes. A solvent container must be able to receive a solute cup submersible at various heights. Having an open top on a container facilitates such submersion, but is not the only option. It is possible to design a universal mixture maker where a container is covered with a top portion, as long as there is an inlet access for adding and removing solvents. Inlets may be closed with a removable cover. Gaseous solutes and solvents may thus be held in and measured with a universal mixture maker. Some gases sink while others rise. It is possible to incorporate moving markings to indicate levels of invisible gasses. Cup and containers may have drains that can be plugged up during measuring. Other shapes and designs of cups and containers not explicitly described here which deliver similar results may also be used, and are all within the scope of the present disclosure.

Operations illustrated in the present disclosure highlight four primary variables in mixture equations: solute volume, solvent volume, final mixture volume, and final solute concentration level. Some variables may be assigned a known value, and others have their values found using an iterative method as described. But there are other variables in mixture making, such as the concentration of an input solute. An input solute may have a 100 vol % concentration, such a store-bought 100 vol % glycerol. Some input solutes may come in known stock concentrations such as 1M, 2M, 3M, 4M and 5M NaCl stock solutions. When it is desirable to find the right input concentration to use, different types of calibrated indicia columns may be designed, such that an operator can mechanically find the right input solute concentration to use. This may also be aided by an augmented reality app. Other mixture variables not explicitly described here which can be mechanically solved by a universal mixture maker are therefore also within the scope of the present disclosure.

Operations illustrated in the present disclosure use submersion of a solute cup in a solvent container as a mechanism to determine the output concentration level of a solution in an output solution. There are other ways of further altering output concentration levels, including submerging a block of known shape and volume, inflating a flexible and submerged balloon, tilting a solvent container or a solute cup, etc. As long as these additional mechanisms as deployed alongside the basic principle of submerging a solute cup in a solvent container, they are all within the scope of the present disclosure.

CONCLUSION

Embodiments presented in this disclosure address an unrecognized problem in mixture making, that depending on which variables are known and which variables are to be solved, mixture-making scenarios require different measuring instruments, processes, scenario-specific analytical calculations, weighing scales, hydrometers, etc. Many in the art do not recognize that there is even a problem to fix.

Some in the art have attempted to make improvements. But until the present disclosure, potential solutions have been limited to making measuring easier in specific scenarios. A universal mixture making instrument has been presumed unworkable.

The present disclosure addresses this presumed insoluble problem with a universal mixture making instrument and a corresponding iterative method. The universal mixture maker is defined by objectives including: 1) elimination of analytical calculations and weighing scales from the process, 2) universality of the iterative method in solving for different variables in multivariate mixture equations, 3) simplicity of manufacture, and 4) durability of the instrument.

Innovations in the present disclosure start with a contrarian idea, that of dunking one measuring vessel inside another measuring vessel. This leap of faith and two more steps together deliver many embodiments of a universal mixture maker that meet aforementioned goals. The three key steps in the iterative method are:
submerging one measuring vessel in another
making the level of submersion adjustable and fastenable
making levels of solutes and solvents in vessels visible to an operator This leap of faith yields unexpected results. The long list of embodiments and corresponding new principles of operation in the present disclosure demonstrate foremost the elimination of analytical calculations and weighing scales from the measuring and mixing process. The same iterative method provides a universal coverage over a wide range of scenarios, solving different combinations of variables. Embodiments shown in the present disclosure have simple geometries, are substantially rigid, and take generally fixed shapes. These embodiments are thus easy to manufacture, and may be made durable.

In conclusion, the universal mixture maker reduces otherwise-complicated and situation-specific analytic calculations down to a manual adjustment of the degree of cup submersion, and a visual comparison of surface level markings. It is a contrarian invention.

I claim:

1. A mixture maker for mixing a solvent with one or more solutes to create a resultant mixture, comprising:
    a solvent container for receiving said solvent;
    said solvent container comprising one or more sidewalls, and a bottom portion;
    one or more impermeable solute cups for receiving said solutes;
    each said solute cup comprising one or more sidewalls, and a bottom portion;
    each said solute cup being submersible in said solvent within said solvent container;
    each said solute cup being provided with a retaining member;
    each said retaining member being removably engaged to said solvent container, such that the position of said solute cup with respect to said solvent container can be continuously adjusted for different levels of submersion, and that said solute cup can be fastened to said solvent container at any said levels of submersion;
    said solvent container providing a visual indication of the surface level of said solvent contained within; and
    each said solute cup providing a visual indication of the surface level of said solute contained within.

2. The mixture maker of claim 1 further comprising:
said solvent container comprising a max fill line; and
at least one of said solute cups being submersible, adjustable and fastenable such that said bottom portion of said solute cup can be positioned within a substantial range between said max fill line and said bottom portion of said solvent container.

3. The mixture maker of claim 1 further comprising:
said solvent container providing volumetric indicia comprising a plurality of mixture markings.

4. The mixture maker of claim 1 further comprising:
At least one of said solute cups providing volumetric indicia comprising a plurality of solute markings.

5. The mixture maker of claim 1 further comprising:
said sidewalls and said bottom portion of said solvent container being substantially rigid and generally fixed-shape; and
said sidewalls and said bottom portion of said solute cups being substantially rigid and generally fixed-shape.

6. The mixture maker of claim 1 further comprising:
a plurality of said solute cups sharing a substantially similar design for providing said retaining member, such that one or more of said plurality of said solute cups can be submerged in said solvent and engaged to said solvent container, in an interchangeable and modular fashion.

7. The mixture maker of claim 1 further comprising:
a solvent inlet space being provided between said solvent container and at least one of said solute cups.

8. The mixture maker of claim 1 further comprising:
at least one of said sidewalls of said solvent container being transparent such that said surface level of said solvent contained within can be visually sighted through said sidewall; and
at least one of said sidewalls of each said solute cup being transparent such that said surface level of said solute contained within can be visually sighted through said sidewall.

9. The mixture maker of claim 1 further comprising:
at least one of said solute cups providing said retaining member for fastening one of said sidewalls of said solute cup to one of said sidewalls of said solvent container, in the form of a clamp, a resilient clip, a T-slot, a T-slide, or similar, as an extended portion of said solute cup or as a removably engageable member.

10. The mixture maker of claim 1 further comprising:
said solvent container providing at least a pole projecting upward from said bottom portion of said solvent container;
at least one of said solute cups providing said retaining member in the form of a hollowed tube projecting upward from said bottom portion of said solute cup, for receiving one of said pole; and
each of said hollowed tube being provided with a fastening mechanism including by friction, by air pump, and by male-female threads.

11. The mixture maker of claim 1 further comprising:
each said solute cup providing one or more calibrated indicia columns; and
each said indicia column showing a plurality of calibrated markings.

12. The mixture maker of claim 11 further comprising:
each said indicia column showing an output concentration level; and
each of said calibrated markings of each said indicia column is calibrated to correspond to an output mixture marking.

13. The mixture maker of claim 11 further comprising:
each said indicia column showing said calibrated markings is provided as a customizable part which can be attached and removed from said solute cup.

14. The mixture maker of claim 11 further comprising:
each said indicia column being recognizable by an augmented reality app on a computing device such that when viewed through said augmented reality app said indicia column is displayed on said augmented reality app accompanied by virtual markings and labels including said calibrated markings.

15. The mixture maker of claim 11 further comprising:
said bottom portion of said solvent container being generally acute;
said sidewalls of said solvent container forming generally a cone;
said solvent container being provided with a flaring spout creating a solvent inlet space, and a threaded pole projecting upward from said bottom portion of said solvent container;
one of said solute cups being provided;
said bottom portion of said solute cup being generally acute;
said sidewalls of said solute cup forming generally a cone; and
said solute cup being provided with a hollowed and threaded tube projecting upward from said bottom portion of said solute cup, serving as said retaining member, for receiving said threaded pole.

16. The mixture maker of claim 11 further comprising:
said sidewalls of said solvent container forming a plurality of chambers each comprising a generally acute bottom portion, a generally conical sidewall, a flaring spout creating a solvent inlet space, and a threaded pole projecting upward from said bottom portion of said chamber;
said bottom portion of said solvent container forming generally a pipe connecting said chambers;
said bottom portion of each of said solute cups being generally acute;
said sidewalls of each of said solute cups forming generally a cone; and
each of said solute cups being provided with a hollowed and threaded tube projecting upward from said bottom portion of each of said solute cups, serving as said retaining member, for receiving said threaded pole of one of said chambers.

17. An iterative method for preparing a mixture at desired concentration levels, from a solvent and one or more solutes, with a fixed-shaped container and one or more fixed-shaped cups, without the use of weighing scales and analytic formulae, comprising the steps of:
    (a) adding a solute into one of one or more solute cups;
    (b) remove a portion of said solute from said solute cup;
    (c) adding a solvent into a solvent container;
    (d) removing a portion of said solvent from said solvent container;
    (e) submerging said solute cups in said solvent;
    (f) adjusting submersion level of each said solute cup;
    (g) fastening each said solute cup to said solvent container via a retaining member; and
    (h) comparing the surface level of said solvent in said solvent container to the surface level of said solutes in said solute cups.

18. The iterative method recited in claim 17 further comprising:
assigning values to at least one or more variables including the volume of said solute in one of said solute cups, the volume of said solvent in said solvent container, the final volume of a mixture, and the concentration level of said solute in one of said solute cups; and
solving for one or more of said variables that are not assigned a value.

19. The iterative method recited in claim 17 further comprising:
producing a saturated solution from solid granules for use as one of said solutes.

20. The iterative method recited in claim 17 wherein:
at least one of said steps is aided by the use of an augmented reality app on a computing device.

* * * * *